US012639751B2

(12) United States Patent
Vij et al.

(10) Patent No.: US 12,639,751 B2
(45) Date of Patent: May 26, 2026

(54) SYSTEM AND METHOD FOR RECONCILIATION OF ELECTRONIC DATA PROCESSES

(71) Applicant: ROYAL BANK OF CANADA, Toronto (CA)

(72) Inventors: Kanika Vij, Toronto (CA); Igor Reshynsky, Toronto (CA); Eujean Kim, Toronto (CA); Rowan Comish, Toronto (CA); Jingyi Gao, Toronto (CA); Adam Lazure, Toronto (CA); Abdulrahman Allahham, Toronto (CA)

(73) Assignee: ROYAL BANK OF CANADA, Toronto (CA)

(*) Notice: Subject to any disclaimer, the term of this patent is extended or adjusted under 35 U.S.C. 154(b) by 0 days.

(21) Appl. No.: 17/138,092

(22) Filed: Dec. 30, 2020

(65) Prior Publication Data

US 2021/0201403 A1 Jul. 1, 2021

Related U.S. Application Data

(60) Provisional application No. 62/954,917, filed on Dec. 30, 2019.

(51) Int. Cl.
*G06Q 40/03* (2023.01)
*G06Q 10/0631* (2023.01)
*G06Q 40/12* (2023.01)

(52) U.S. Cl.
CPC ....... *G06Q 40/03* (2023.01); *G06Q 10/06311* (2013.01); *G06Q 40/12* (2013.12)

(58) Field of Classification Search
CPC . G06Q 40/025; G06Q 10/06311; G06Q 40/12
See application file for complete search history.

(56) References Cited

U.S. PATENT DOCUMENTS

| | | | | | |
|---|---|---|---|---|---|
| 7,333,923 | B1 * | 2/2008 | Yamanishi | ....... | G06Q 10/06395 |
| | | | | | 706/14 |
| 2013/0085769 | A1 * | 4/2013 | Jost | ........................ | G16H 10/60 |
| | | | | | 705/2 |

(Continued)

OTHER PUBLICATIONS

Kenton, Will. "Quartile" Investopedia.com, <https://web.archive.org/web/20190425031032/https://www.investopedia.com/terms/q/quartile.asp> Sep. 7, 2017. (Year: 2017).*

(Continued)

*Primary Examiner* — Elda G Milef
(74) *Attorney, Agent, or Firm* — Norton Rose Fulbright Canada LLP

(57) ABSTRACT

Risk levels for accounts are assessed based on account data for the accounts, including reconciliation status and balance values. For each of the accounts, risk criteria scores are assigned for a plurality of risk criteria, based at least in part on one or more of reconciliation status and balance value for the account, and a composite risk score is determined for the account based on a weighted summation of a selection of the risk criteria scores for the account. A density distribution of the composite risk scores is generated for an audit population of the accounts, and quantiles determined. Thresholds are identified based at least in part on the quantiles of the density distribution, and a risk rating assigned to each of the accounts in the audit population based at least in part on the composite risk score for that account as compared to the thresholds.

20 Claims, 19 Drawing Sheets

(56) References Cited

U.S. PATENT DOCUMENTS

| | | | |
|---|---|---|---|
| 2015/0215304 A1* | 7/2015 | Cao | H04L 63/102 |
| | | | 726/6 |
| 2017/0193401 A1* | 7/2017 | Grehant | G06F 16/22 |
| 2017/0270534 A1* | 9/2017 | Zoldi | G06Q 50/26 |
| 2018/0040062 A1* | 2/2018 | Dintenfass | G06Q 40/02 |
| 2018/0089296 A1* | 3/2018 | Pham | G06F 16/2379 |
| 2019/0340701 A1* | 11/2019 | Tayal | G06Q 10/063114 |

OTHER PUBLICATIONS

Walter J. Scheirer et al., "Toward Open Set Recognition" IEEE Transactions on Pattern Analysis and Machine Intelligence, vol. 35, No. 7. Jul. 2013. (Year: 2013).*

Chinchilla, "Data Science in a Box With Dataiku",HackerNoon. com Sep. 22, 2017. https://hackernoon.com/data-science-in-a-box-with-dataiku-8ee10910fe79. (Year: 2017).*

"7 Awesome Things You Can do in Dataiku Without Coding" https://blog.dataiku.com/7-awesome-things-you-can-do-without-coding-in-dataiku; Nov. 2, 2018. (Year: 2018).*

"Consolidating SQL Server Databases." <https://learn.microsoft. com/en-us/archive/blogs/mvpawardprogram/consolidating-sql-server-databases>; Jan. 9, 2012 (Year: 2012).*

Artemiou, Artemakis. "SQL Server Consolidation-Hosting Multiple Databases on a Single SQL Server Instance." <https://www.sqlshack. com/sql-server-consolidation-hosting-multiple-databases-single-sql-server-instance/>; Dec. 2, 2016 (Year: 2016).*

* cited by examiner

202

Custom SQL Query

⬛ ☰ Sort fields  Data s

Custom SQL Query   Custom SQL
Platform       Rollup No

Microsoft SQL Server
SEI31543JN01

Server:    SEI31543JN01

Database:  DBS00_FIN_LAB

Enter information to sign in to the database:

◉ Use Windows Authentication (preferred)

○ Use a specific username and password:

Username:

Password:

☐ Require SSL
☐ Read uncommitted data

Initial SQL...

720

721 722 723 724 725 726 727 728

740

741

742

743

744

745

746

747

748

749

750

800

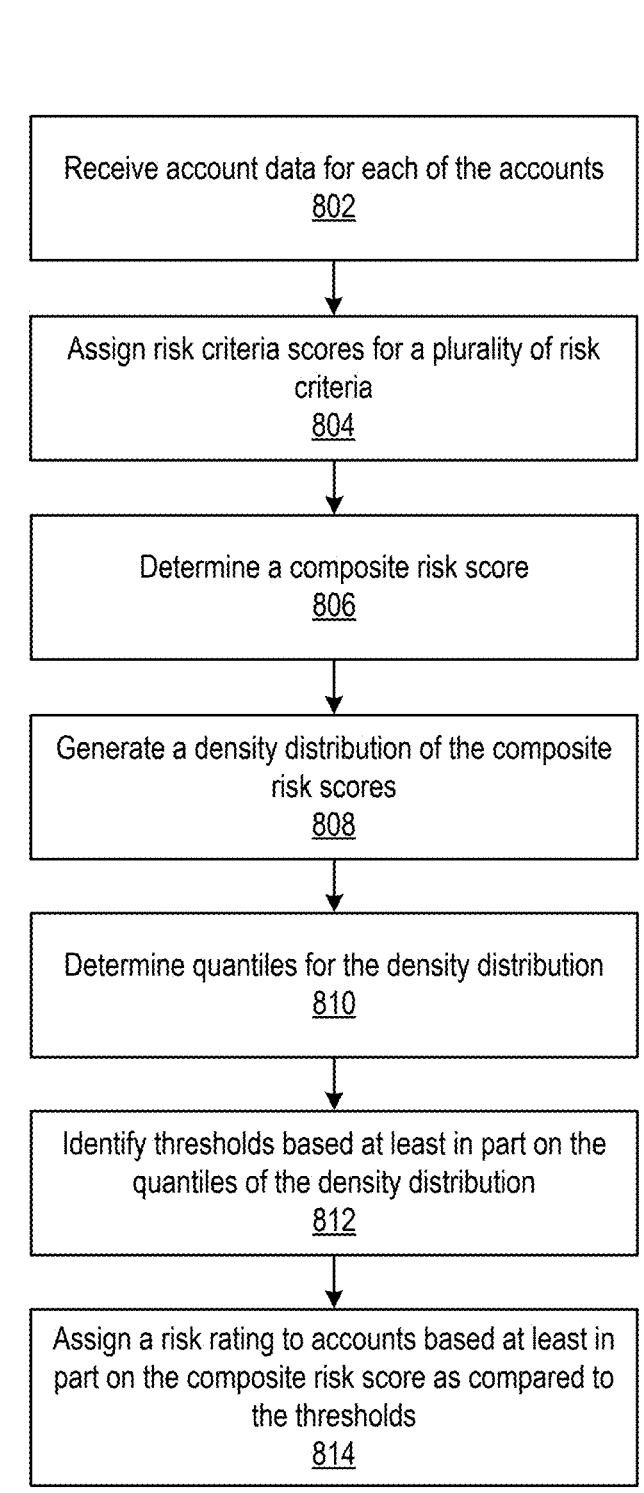

Receive account data for each of the accounts
802

Assign risk criteria scores for a plurality of risk criteria
804

Determine a composite risk score
806

Generate a density distribution of the composite risk scores
808

Determine quantiles for the density distribution
810

Identify thresholds based at least in part on the quantiles of the density distribution
812

Assign a risk rating to accounts based at least in part on the composite risk score as compared to the thresholds
814

SYSTEM AND METHOD FOR RECONCILIATION OF ELECTRONIC DATA PROCESSES

CROSS-REFERENCE TO RELATED APPLICATION(S)

This application claims priority from U.S. Provisional Patent Application No. 62/954,917, filed on Dec. 30, 2019, the entire contents of which are hereby incorporated by reference herein.

FIELD

This disclosure relates to automated account reconciliation, and in particular automated risk assessment for account reconciliation of electronic data processes.

BACKGROUND

In traditional account reconciliation, a general ledger may be used to collect individual ledger accounts. General ledger reconciliation is the process of ensuring that accounts contained in the general ledger are correct, and that sets of records (usually the balances of accounts) are in agreement.

SUMMARY

According to an aspect, there is provided a computer-implemented method for assessing a risk level for accounts, comprising: receiving account data for each of the accounts, the account data including a reconciliation status and a balance value for each account; for each of the accounts: assigning risk criteria scores for a plurality of risk criteria, based at least in part on one or more of reconciliation status and balance value for the account; and determining a composite risk score for the account based on a weighted summation of a selection of the risk criteria scores for the account; generating a density distribution of the composite risk scores for an audit population of the accounts; determining quantiles for the density distribution; identifying thresholds based at least in part on the quantiles of the density distribution; and assigning a risk rating to each of the accounts in the audit population based at least in part on the composite risk score for that account as compared to the thresholds.

In some embodiments, the quantiles are quartiles.

In some embodiments, for an account having a composite risk score less than or equal to a third quartile of the density distribution, the risk rating assigned is low risk; for an account having a composite risk score between the third quartile and the third quartile plus a weighted factor of an inter-quartile range of the density distribution, the risk rating assigned is medium risk; and for an account having a composite risk score greater than or equal to the third quartile plus the weighted factor of the interquartile range of the density distribution, the risk rating assigned is high risk.

In some embodiments, the method further comprises, for each of the accounts, determining whether the balance of the account exceeds a balance threshold, the balance threshold based at least in part on a density distribution of balances of accounts in a grouping.

In some embodiments, the audit population includes accounts within a geographic region.

In some embodiments, the audit population includes a selected number of the accounts.

In some embodiments, the method further comprises, for each of the accounts, identifying whether the account is an asset or a liability and a sign of the balance value, and the risk criteria scores include a risk criteria score for an illogical balance of the account based at least in part on whether the account is an asset or a liability and the sign of the balance value.

In some embodiments, the method further comprises, for each of the accounts, comparing the balance value to historical balance data for the account to determine a number of months that the balance value has been static, and the risk criteria scores include a risk criteria score for a static balance for the account based at least in part on the number of months the balance has been static compared to a density distribution of a number of months all of the accounts have been static.

In some embodiments, the method further comprises, for each of the accounts, determining a median balance value and an interquartile balance value range for the account based on historical balance values, and the risk criteria scores include a risk criteria score for an account balance outlier based at least in part on whether the balance value for the account is above the interquartile balance value range.

In some embodiments, the method further comprises, for each of the accounts, determining a number of months that the reconciliation status has a pending approval based on historical data, and the risk criteria scores include a risk criteria score for pending approvals based at least in part on the number of months the account has had a pending approval as compared to a density distribution of a number of months all of the accounts have had pending approval.

In some embodiments, the method further comprises, for each of the accounts, comparing the reconciliation status to historical reconciliation data for the account to determine a number of times an attestation has changed in a time period, and the risk criteria scores include a risk criteria score for changing attestations based at least in part on the number of times an attestation has changed as compared to a density distribution of a number of times attestation has changed for all of the accounts.

In some embodiments, the risk criteria scores include a risk criteria score for new accounts based at least in part on an age of the account.

In some embodiments, the risk criteria scores include a risk criteria score for changing preparer and manger based at least in part on a number of times a combination of prepare and approving manager associated with the account changes as compared to a density distribution of a number of times a combination of prepare and approving manager has changed for all of the accounts.

In some embodiments, at least one of the risk criteria scores is a value of zero or one on a binary scale.

In some embodiments, at least one of the risk criteria scores is a value on a continuous scale.

In some embodiments, the method further comprises performing a log function on the at least one of the risk criteria scores.

In some embodiments, the method further comprises performing min-max scaling on the at least one of the risk criteria scores.

In some embodiments, the method further comprises selecting accounts for review based at least in part on the assigned risk ratings of the accounts from within the audit population.

According to another aspect, there is provided a computer system comprising: a processor; and a memory in communication with the processor, the memory storing instructions that, when executed by the processor cause the processor to perform a method as disclosed herein.

According to a further aspect, there is provided a non-transitory computer-readable medium having computer executable instructions stored thereon for execution by one or more computing devices, that when executed perform a method as disclosed herein.

Other features will become apparent from the drawings in conjunction with the following description.

BRIEF DESCRIPTION OF DRAWINGS

In the figures which illustrate example embodiments,

FIG. 8 is a flow chart of a method for risk assessment, according to an embodiment;

FIG. 10 is an example of an account record including data generated using risk assessment techniques, according to an embodiment.

DETAILED DESCRIPTION

Systems and methods described herein may provide for automated testing and analysis of risk, based on reconciliation of electronic data processes.

Traditionally, a number of different audits may be performed on an account, such as a general ledger. Reconciliation may be performed randomly to determine if an account is reconciled.

Organizational structure may be such that each account has an individual owner associated with it, in a general ledger.

Systems and methods described herein may be used to monitor and track the attestation of balance sheet accounts in a general ledger (GL). GL accounts may be reconciled every month and may be assigned one of the following statuses: Fully Reconciled, Reconciled with Exceptions, Reconciled with Process Issues, Not Reconciled, Unassigned, Request Reassignment.

Various individuals can be involved in a reconciliation process. GL accounts can be assigned to individuals who are then responsible for the attestation on a monthly basis. The responsibility to assign GL accounts may be at the controller level. GL accounts will go through three levels of attestations each month. The hierarchy of the attesters can include: manager, group head, and controller. Reconciliation can be performed by the account owner or controller, which is then reviewed by a manager, and followed by approval by a group head.

Each individual can attest that reconciliation was performed correctly. Each individual performing attestation may designate an appropriate status. Comments may be added if an account is not fully reconciled, for example, noting account balance discrepancies.

A risk assessor 100 described herein may be a system configured to identify a risk level for various reconciliations in an account 101 based on different factors or risk criteria.

Figure 1:
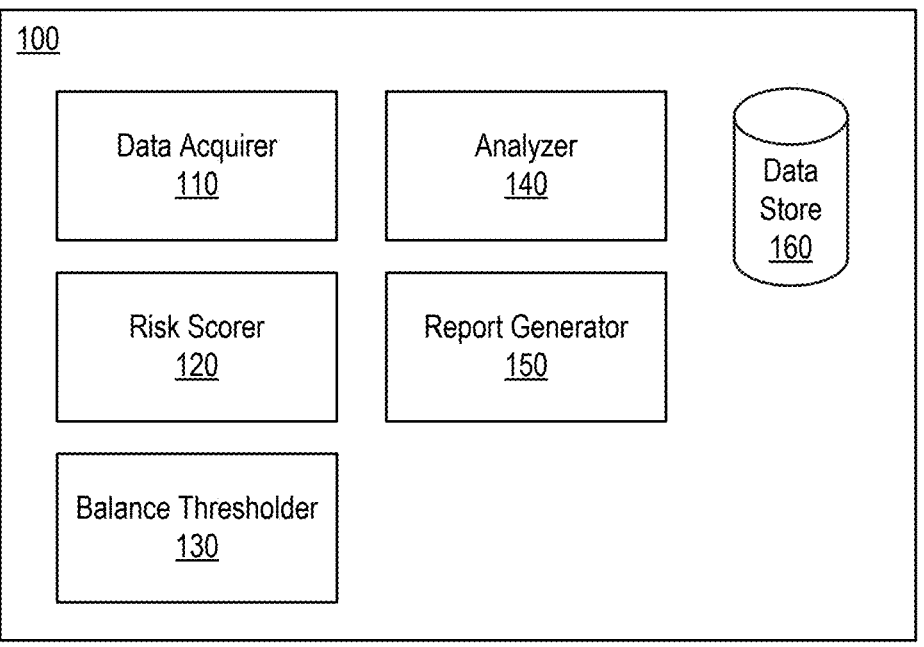
FIG. 1 is a schematic diagram of a risk assessor, according to an embodiment.

FIG. 1 illustrates a risk assessor 100, in an embodiment. Risk assessor 100 can be embodied as an unsupervised non-parametric model for detecting high risk entities (i.e., accounts 101) within an audit population.

Risk assessor 100 includes a data acquirer 110 to collect data including account records 111 for accounts 101, a risk scorer 120 to score features (such as with a risk criteria score 124 for each risk criteria 122) which can be summed to form a composite risk score 126 for an account, a balance thresholder 130 to compare account balances to a threshold, an analyzer 140 to determine a density distribution of composite risk scores 126 and select accounts 101 to sample, a report generator 150 for generating reports and visualizations of data from risk assessor 100, and a data store 160 for storing data.

Data acquirer 110 can be configured to collect data relevant to accounts 101 to perform risk assessment on such accounts 101. Such accounts 101 can include balance sheet accounts in a general ledger (GL) of an enterprise.

In some embodiments, data acquirer 110 collects data on a monthly basis or other time frame. The collected data can contain account records 111 of account data from a server, in an example, over a network, such as a SQL server.

Risk assessor 100 may connect directly to databases containing account information, and extract information on a schedule, in an example, monthly, and automatically. Relevant files (for example containing reconciliation information) may be extracted, merged and analyzed, and output as a data governance tool.

Figure 10:
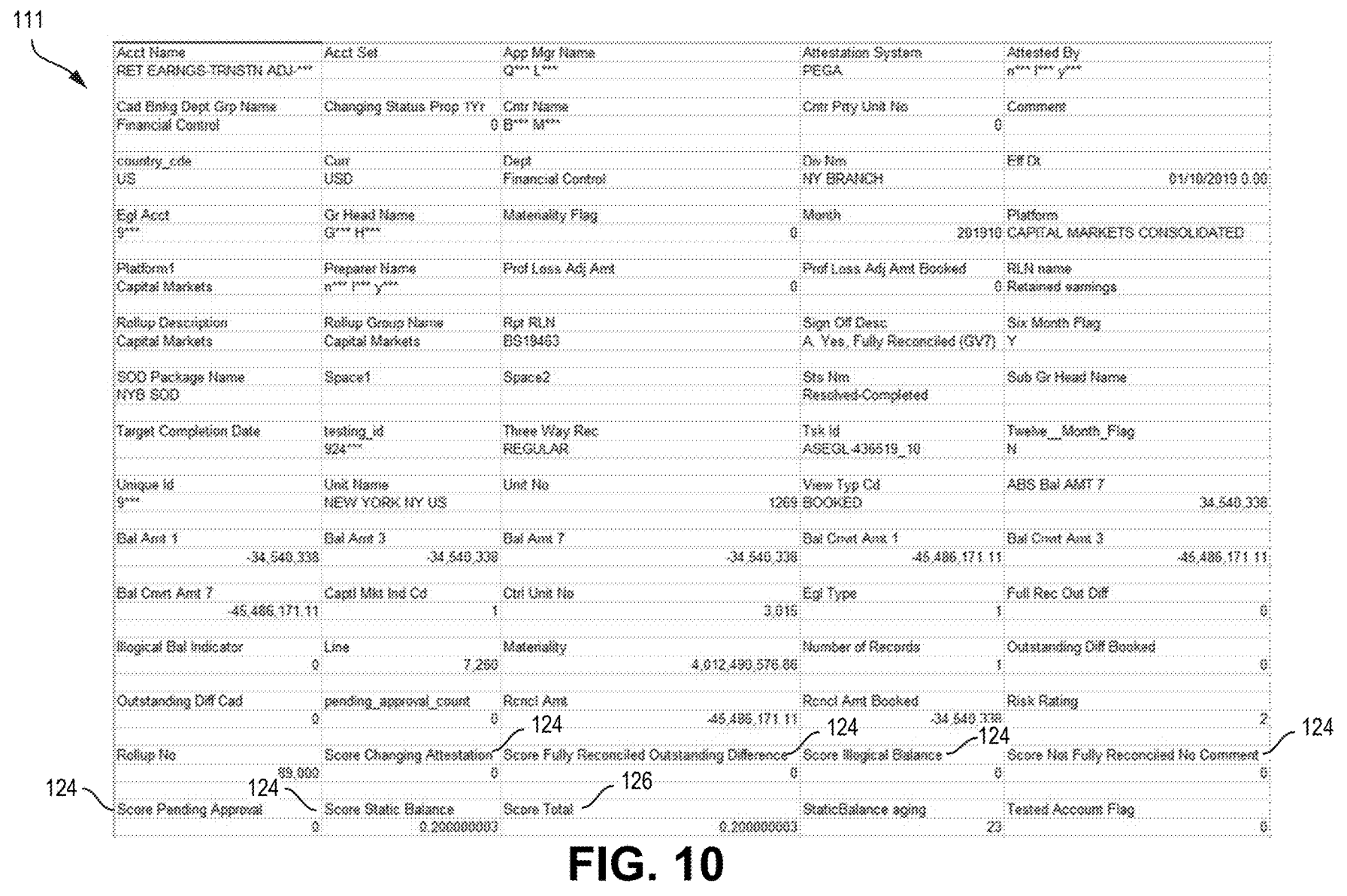

An account record 111 can contain data relating to an account 101 that has been (or needs to be) reconciled, and can be stored in a suitable database such as data store 160. An example account record 111 is illustrated in FIG. 10.

Figure 2:
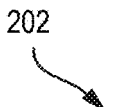
FIG. 2 is a screenshot of an interface to access data for risk assessment, according embodiment.

FIG. 2 illustrates a screenshot of an interface 202 to access a Microsoft SQL Server from which data acquirer 110 can access data, in particular, account records 111 of account data, according to an embodiment.

A total number of lines check may be performed on the collected data by comparing the total number of lines in the collected data to the total number of lines in existing or historical data, providing a general ballpark estimate for how much data to expect. An exact match may not be necessary, however, in the event of a discrepancy (such as collected data containing far fewer records than expected), a responsible team may be contacted to query why this is the case.

Balances of the collected data may be compared against balance data obtained from other sources, which may ensure accuracy of the collected data, and a report can be generated to highlight any variances or exceptions.

An overall check may be performed on the collected data by counting the number of account records 111 in the data as compared to an expected value. In an example, the expected value may be approximately 100,000 account records 111 per month.

Data acquirer 110 may evaluate consistency between file nomenclature of the collected data and automatically-generated names. Nomenclature in the source data is not "generated", it is fixed and should stay the same month over month. Data acquirer 110 can check to see if the nomenclature in the data is exactly equal to what is expected. In the event that it is not, a responsible team may be contacted to query why this is the case.

Dates of account records 111 in the collected data may also be evaluated to identify duplicate account records 111. Duplicate records may be removed from the data. If duplicate records ever became an issue, a responsible team may be contacted regarding data integrity.

Column names of the collected data may also be evaluates for consistency as between historical records. If there is a change, the data may not be loaded.

Conveniently, the above data checks performed by data acquirer 110 may assure completeness of the collected data and account records 111 therein.

Risk scorer 120 can be configured to determine risk criteria score 124 for risk criteria 122 in an account 101, based on data in the account record 111. Risk scorer 120 may score one or more of risk criteria 122. One or more of risk criteria scores 124 can be summed to form a composite risk score 126 for an account 101.

In some embodiments, risk assessor 100 defines risk criteria 122 in data fields associated with a reconciliation on an account 101, and evaluates the performed reconciliation and other variables of the account record 111 to identify risky behaviour.

Risk assessor 100 may evaluate various risk criteria 122 based on data extracted from the account record 111. For each account record 111 risk scorer 120 quantifies the risk of the indicators (risk criteria 122) with a risk criteria score 124.

Risk criteria scores 124 determined based on an account record 111 for an account 101 can be stored and added as a variable in that account record 111, shown by way of example in FIG. 10, including risk criteria scores 124 such as for "Score changing Attestation", "Score Fully Reconciled Outstanding Difference", "Score Illogical Balance", "Score Not Fully Reconciled No Comment", "Score Pending Approval", and "Score Static Balance".

Each account's composite risk score 126 can be calculated as the sum of all the quantified values of risk criteria scores 124. A higher composite risk score 126 can correlate with a higher the probability that the account 101 is high risk.

An account 101 can be evaluated on the basis of its account record 111, against risk criteria 122, such as that disclosed herein.

Risk criteria 122 can include: accounts with pending approvals, illogical balances, changing attestations or other behavior in attestation, static balances, volatile balance, new balance sheet accounts, changing preparer and approving manager combination, risky descriptions in comments field, and accounts with unreconciled balances and reconciled status. Risk criteria 122 are described in further detail, below.

"Pending approvals" is a risk criteria 122 relating to whether the account has any attestations that are pending approval, for example, from an individual at various levels in an organization and past a deadline. An assumption is that if an account has not been attested to by all levels, then the reconciliation has not been appropriately reviewed. This may result in an under or overstatement of GL account balances, incomplete and/or inaccurate financial and management reporting.

"Illogical balances" is a risk criteria 122 relating to the balance value of an account. In accounting, a balance sheet can include assets and liabilities. Assets may be expected to have a debit balance and liabilities to have a credit balance. Accounts carrying balances of the opposite sign could be incorrectly classified, or the balance could be carrying erroneous entries.

"Changing attestations" is a risk criteria 122 relating to the attestations associated with an account. If an account is constantly changing its reconciliation status, it could indicate that the account is more complicated and prone to errors, or that the account owner does not have the experience to reconcile the account appropriately.

"Static balances" is a risk criteria 122 relating to the balance of an account remaining static. GL accounts with static balances may have issues with completeness, accuracy and existence, due to the business possibly not being aware of what the balance is and/or not adequately challenging whether there should have been changes in balances.

"Volatile balance" is a risk criteria 122 relating to the volatility of an account balance. GL accounts with higher volatility may have issues with accuracy and existence, due to the business possibly not understanding the reason of frequent large changes and/or not adequately challenging whether there should have such large changes in balances.

"New balance sheet accounts" is a risk criteria 122 relating to the lifetime age or newness of an account. GL accounts that are newly created may have issues with completeness, accuracy and existence, due to the business possibly not understanding what the balance is or unfamiliar with the reconciliation process.

"Changing preparer and approving manager combination" is a risk criteria 122 relating to the assigned preparer, attester, or approving manager for an account. GL accounts with changing attester and approving manager combination may have issues with completeness, accuracy, and existence, due to the business possibly not understanding what the balance is and/or not adequately challenging whether the balance is accurate.

For each risk criteria 122, a risk criteria score 124 may be assigned as an assessment of risk level for that risk criteria 122 for an account 101. In some embodiments, risk criteria scores 124 are feature engineered variables, and can be calculated for every entity (account) in an audit population. A feature engineered variable as a risk criteria score 124 can either be binary or continuous, and may be weighted. Both binary or continuous risk criteria scores 124 can exhibit an ascending risk structure, in other words, a higher value implies a higher risk.

In some embodiments, a risk criteria score 124 can be a value on a scale between 0 and 1, where 0 is least risky and 1 is most risky.

Risk criteria scores 124 may be binary (set to 0 or 1 depending on whether a condition is met), or may be on a sliding scale, at a value between 0 and 1 depending on a level of risk evaluated. Risk criteria scores 124 may be dynamic and differ from month to month.

In evaluating a "pending approvals" risk criteria 122, risk scorer 120 identifies account records 111 that are pending approval from organizational levels that may be required, for example, from approving managers, group heads and controllers, and that have been pending past a time deadline.

An account record 111 can be scored on "pending approvals" by evaluating historical account data, for example, over a period of a single year or multiple years, and determines if the account has a pending approval status month over month. Risk scorer 120 can count the number of times the account is consecutively "pending approval", and assigns a risk criteria score 124 for "pending approvals" for that account using a continuous scoring based on a distribution of risk criteria scores 124 for a population of accounts 101, which may be transformed to a scale between 0 and 1, for example, using a log transformation and min-max scaling, as described below with reference to continuous scores.

In some embodiments, there may be group heads who are constantly not approving their accounts (which may be for a variety of reasons, such as forgetting or being unsure), this behavior may not be flagged as risky if it occurs once or twice. However, if repeat behaviors are detected, and the more frequently they occur, a higher risk criteria score 124 for pending approvals may be assigned.

In some embodiments, a risk criteria score 124 for pending approvals can be based on a rolling count of the number of times a particular account's attestation status has been pending approval and then scaled or weighted. The risk criteria score 124 for pending approvals can be weighted based on the rolling count, such that for a count of >=1 a risk criteria score 124 of "0.2" is assigned; >3 a risk criteria score 124 of "0.4" is assigned; >5 a risk criteria score 124 of "0.6" is assigned; >7 a risk criteria score 124 of "0.8" is assigned; >9 a risk criteria score 124 of "1" is assigned; else a risk criteria score 124 of "1" is assigned.

In some embodiments, risk scorer 120 identifies accounts that are pending approval from the following levels: Approving Managers, Group Heads and Controllers past a time period, for example, past a GV 16 deadline. All accounts 101 may be required to be approved by all such levels. A first boxplot may be generated based on the total number of accounts that are still pending approval (for example, that an approver missed). A second boxplot may be generated based on the dollar value of the accounts that are still pending approval (for example, that an approver missed).

In some embodiments, the boxplots can then be used to determine which accounts should be sampled by analyzer

140 depending on where they are plotted on the graph. Statistical outliers include data points that are 1.5×IQR (where IQR is the range between the 1st and 3rd quartile) below the first quartile or above the third quartile, or in another example, values outside of balance thresholds disclosed herein.

For "illogical balances", risk scorer 120 identifies account records 111 having illogical balances, which can be defined as asset accounts with credit balances and liability accounts with debit balances.

Risk scorer 120 identifies an account type of account record 111 as an asset account or a liability account, based on the account type. Risk scorer 120 then identifies a balance for the account. If a negative balance is identified for an asset account (which can be considered a sign of the balance value that is opposite of what is expected) a risk criteria score 124 of "1" is designated for illogical balances for that account. Similarly, if a positive balance is identified for a liability account (which can be considered a sign of the balance value that is opposite of what is expected), a risk criteria score 124 of "1" is designated for illogical balances for that account. Otherwise, a score "0" is designated for illogical balances for that account.

In some embodiments, a risk criteria score 124 for illogical balances may be set as "1" if an account is attested as "fully reconciled" but contains a sign of the balance value that is opposite of what is expected, for example, as described above.

In some embodiments, a risk criteria score 124 for illogical balances may be set as "1" if an account is approved by an attesting controller but contains a sign of the balance value that is opposite of what is expected, for example, as described above.

In some embodiments, a risk criteria score 124 for illogical balances may be weighted such that scores of "1" are scaled to "0.1", and otherwise are "0".

In some embodiments, certain accounts 101 may be excluded from an illogical balances scoring criteria. For example, certain accounts may be illogical by nature, such as dividends paid, netting account, and the like. Therefore, even if the above criteria are met for such accounts, a risk criteria score 124 of "0" may be assigned if the account is on an excluded list.

In some embodiments, substring matching may be used to identify accounts to be excluded, namely for which an illogical balance score may be ignored or set to zero. Such matching may be not case sensitive. Any account names that contain any part of the following non-exhaustive list, which is subject to change, may be excluded:

| | |
|---|---|
| ACC AMORT | NET CLEARINGS & PAYMENTS |
| ACC AMORTN | ACCTS |
| ACC DEPR | OCE-FX TRSLTN G/L-HEDGING CTA |
| ACCUM AMORT | POSITION ACCOUNT-HEDGING & |
| ACCUM DEPR | OTH |
| ACCUM DEPRE | REPO NETTING |
| ACCUM DEPREC | RET EARNGS |
| ACCUM DPREC | RETAIN EARN |
| ACCUMULATED DEPREC | RETAIN EARNNG |
| ADDTL PAID-IN CAPTL(SB) | RETAIN EARNGS |
| CUR ACCTS OFFSET ACCT | RETAINED EARNGS |
| CURENT ACCTS OFFSET | RETAINED EARNINGS |
| DIVIDENDS | REVERSE REPO NETTING |
| DIVIDENDS DECLARED | REVERSE REPO NETTING ACCT-NRS |
| DIVIDENDS SUB EQUITY | SEC BOUGHT REV REPOS-IG |
| DSI-CLIENT CAH-REGULR-ALLOCATN | SEC BOUGHT REV REPUR AGREE- |

-continued

| DSI-REVERSE REPO-TRDG- | NRS |
| ALLOCATN | SEC BOUGHT REVR REPUR AGRE- |
| DSI-SECS-TRDG-ALLOCATN | RES |
| I/G RES MTG | SEC SOLD REPURASE AGREEMNT- |
| I/G-JR SUBORD DEBT HELD | RES |
| I/G-NOSTRO CASH ACCOUNT | SEC SOLD RESPOS - INTRA GROUP |
| I/G-SHR OF CONSLDTED SUB-ALLOC | ULZG COMPLEX INT RATE SWP |
| I/G-URLZ GAIN-FX FWD | ULZG-CMPLX XCIRS |
| I/G-URLZ GAIN-XC INT RATE SWAP | ULZG-INT RATE SWAP |
| I/G-URLZ GAIN-XC SWAP | ULZG-XC INT RATE SWAP |
| I/G-URLZ LOSS-XC INT RATE SWAP | ULZG-XC INT RATE SWAP |
| NET CLEARINGS & PAYMENTS | ULZG-XC INT RTE SWAP |
| ULZL-INT RATE SWAP | ULZG-XC SWAP |
| ULZL-XC I/R SWAP | URLZ LOSS-I/R SWAP |
| ULZL-XC SWAP | URLZ LOSS-INT RATE SWAP |
| ULZL-XC SWAP-TRDG | URLZ LOSS-INT RATE SWAP |
| URLZ GAIN-I/R SWAP | URLZ LOSS-INT RATE SWAPS |
| URLZ GAIN-INT RATE SWAP | USD NOSTRO CASH ACCOUNT |
| URLZ GAIN-INT RATE SWAP | CNTRBUTED SURPLUS-RPT(SB) |
| URLZ GAIN-XC INT RATE SWAP | CONTRIBUTED SURPLUS(SB) |
| URLZ GAIN-XC SWAP | SHRS OF CONSLIDTED SUBIDIARIES |

In an example, the account name "ACC AMORT 5894358943" would be excluded on the basis of the list above because it contains the substring "ACC AMORT".

In some embodiments, accounts 101 are flagged as illogical balances for sampling by analyzer 140 by: (1) identifying if account is an asset or liability; (2) determining if 10% of unique accounts or less had an opposite sign under a single GL account number; (3) determining if account is attested to as Fully Reconciled; (4) determining if account is approved by attesting controller; (5) determining if the account balance exceeds a platform threshold balance.

A threshold balance for a platform can be determined based on the lower of, for the platform: 2% of total assets; or one standard deviation away from the mean. "Platform" can refer to a division of business operation within an enterprise such as a financial institution, and is one way to stratify the population of accounts. For instance, a financial institution can have Capital Markets (CM) and Personal and Commercial Banking (P&CB) platforms, to name a couple. Every account in the population may belong to a specific platform.

A balance over 2% of total assets per platform may be considered a material impact to the balance sheet if misstated. However, for some platforms, less than 1% of unique accounts exceed a balance of 2% of total assets and would therefore be set too high as a threshold.

As sampling by analyzer 140 can be performed on the unique account level, it may be necessary to consider the spread of account balances which follows a normal distribution. As such, one standard deviation away from the mean of account balances would capture ~68% of unique accounts per platform. One standard deviation is used as a threshold instead of two standard deviations due to the additional criteria used to select samples which would further reduce the population. The additional criteria includes thresholds, accounts previously sampled within the last six quarters and using the auditor's judgement to consider all geographic regions.

A "changing attestations" risk criteria score 124 can be a weighted score metric for changing status for an account, for example, by identifying accounts that change their attestation frequently in a time period such as the past 12 months.

In some embodiments, a risk criteria score 124 for changing attestations for an account can be determined by risk scorer 120 based at least in part on the following: counting the number of times attestation changed in a time period (for example, 12 month period) (raw count), such as the last 12 months, and assigning a risk criteria score 124 using a continuous scoring based on a distribution of risk criteria scores 124 for a population of accounts 101, which may be transformed to a scale between 0 and 1, for example, using a log transformation and min-max scaling, as described below with reference to continuous scores.

In some embodiments, risk criteria score 124 for changing attestations is based on a proportion of attestation statuses that have changed over a one year period for a given account. The proportion may be weighted to generate a risk criteria score 124, such that if the proportion is >=0.5 a risk criteria score 124 of "0.2" is assigned; if >0.6 a risk criteria score 124 of "0.4" is assigned; if >0.7 a risk criteria score 124 of "0.6" is assigned; if >0.8 a risk criteria score 124 of "0.8" is assigned; if >0.9 a risk criteria score 124 of "1" is assigned; and for all else a risk score criteria 124 of "0" is assigned. Thus, the more changes, the higher risk criteria score 124 assigned.

In some embodiments, accounts 101 are flagged as changing attestations for sampling by analyzer 140 if (1) the attestation status over the last year has changed 75% of the time or more, (2) there are at least 6 months of attestations (attested to on a frequent basis), and (3) the account balance exceeds a platform balance platform threshold (for example, as described above).

In some embodiments, for account records 111 having individuals who change the status of their reconciliation more than 75% of the time in last three years and designate that behavior as high risk and a corresponding high risk criteria score 124.

In another example, risk criteria score 124 may be based on changes between reconciliation status month over month. For example, one month an account is fully reconciled, next month not reconciled, next month reported process issues, next month requesting reassignment. In an example, if an account is changing 75% of the time, a risk criteria score 124 of "1" may be a score assigned to a criteria related to changing status.

A "static balance" risk criteria score 124 is related to the number of months an account's balance has been static for and can identify accounts with an unchanged balance for more than a period of time, for example, 12 months.

In some embodiments, a risk criteria score 124 is based at least in part on historical data, in an example, starting in 2014 or for the last three years of data, and risk scorer 120 counts the number of months the account balance has remained static within that period of time of historical data. A risk criteria score 124 is assigned using a continuous scoring based on the distribution of risk criteria scores 124 for a population of accounts 101, which may be transformed to a scale between 0 and 1, for example, using a log transformation and min-max scaling, as described below with reference to continuous scores.

A risk criteria score 124 for static balance of an account 101 may increase the longer the number of months an account balance has been static. In some embodiments, a risk criteria score 124 for static balance is based on a rolling count of the number of months that a particular account's balance has been static for. The risk criteria score 124 for static balance can be weighted based on the rolling count, such that for a count of >=12 a risk criteria score 124 of "0.2" is assigned; >24 a risk criteria score 124 of "0.4" is assigned; >36 a risk criteria score 124 of "0.6" is assigned; >48 a risk criteria score 124 of "0.8" is assigned; >60 a risk criteria score 124 of "1" is assigned; else a risk criteria score 124 of "1" is assigned.

In some embodiments, certain accounts 101 can be excluded from a risk criteria score 124 for "static balance". Such accounts may be static by nature (for e.g., goodwill, PPE, certified cheques, common shares, etc.) Therefore, even if criteria are met for such accounts to have an risk criteria score 124, risk scorer 120 may assign a score of "0" if the account is on the excluded list.

In some embodiments, substring matching may be used to identify accounts to be excluded, namely for which a static balance score may be ignored or set to zero. Such matching may be not case sensitive. Any account names that contain any part of the following non-exhaustive list, which is subject to change, may be excluded:

ADDTL PAID-IN CAPTL(SB)
    CNTRBUTED SURPLUS-RPT(SB)
    CONTRIBUTED SURPLUS(SB)
    COMMON SHRS ISSUED(SB)
    GOODWILL
    PREFERRD SHRS ISSUED(SB)
    SHR OF CONSLDTED SUB
    SHRS OF CONSLIDTED
    SUBIDIARIES
    INVEST IN RBC FG TIER SUB-COST

In an example, the account name "GOODWILL ACCOUNT 5894358943" would be excluded on the basis of the list above because it contains the substring "GOOD-WILL".

In some embodiments, accounts 101 are flagged as static balances for sampling by analyzer 140 if (1) the account has had the same balance for 12 months, and (2) the account balance exceeds a platform balance threshold (such as described above).

For "changing preparer and approving manager combination" risk criteria score 124, risk scorer 120 can identify accounts with frequently changing combination of "preparer" and "approving manager" individuals assigned to the account.

A risk criteria score 124 for changing preparer and approving manager combination of an account can be determined by counting the number of times the combination of "preparer" and "approving manager" changes in a time period, such as 12 months, and the risk criteria score 124 assigned using a continuous scoring based on a distribution of risk criteria scores 124 for a population of accounts 101, which may be transformed as described below with reference to continuous scores.

For "account balance outlier" risk criteria score 124, risk scorer 120 can identify accounts 101 with balances that are not in an expected range.

In some embodiments, a risk criteria score 124 for account balance outlier can be determined based at least in part by determining a median and interquartile range (IQR), for example, middle 50% of the distribution of balances, for an account balance using historical data, such as all available monthly balances for the account. An account balance for a particular month can be identified as an outlier if the balance is outside of the IQR. A risk criteria score 124 for account balance outlier for an account may be assigned as "1" if the account balance is an outlier. If not, then the risk criteria score 124 may be assigned as "0".

For "other than fully reconciled—no comment" risk criteria score 124, risk scorer 120 identifies accounts 101 that are attested as other than "fully reconciled" and with no comments or comments with less than two words provided by the preparer.

Risk scorer 120 determines the attestation of an account 101, such as "fully reconciled", and what comments were provided for the account. A risk criteria score 124 for "other than fully reconciled—no comment" may be assigned as "1" if the account is attested as other than "fully reconciled" and no comments were provided or the comments are less than two words. If the account is attested as "fully reconciled" or comments were provided with two words or more, a risk criteria score 124 of "0" may be assigned.

For a risk criteria score 124 for "fully reconciled—outstanding difference", risk scorer 120 identifies accounts 101 that are attested as "fully reconciled" but has an outstanding difference (for example, in Canadian dollars) between a reconciled account balance and an account balance reported on a reporting day (such as GV7). If there is an outstanding difference between these values, the account should not be fully reconciled.

In some embodiments, accounts 101 are scored with a risk criteria score 124 for "fully reconciled—outstanding difference" of "1" if the account 101 is attested as "fully reconciled" and there is an outstanding difference. If the account 101 is not attested as "fully reconciled" or there is no outstanding difference, a risk criteria score 124 of "0" is assigned. In some embodiments, a risk criteria score 124 for "fully reconciled—outstanding difference" may be weighted such that if the condition is met a risk criteria score 124 of "5" is assigned, else a risk criteria score 124 of "0" is assigned.

For "new accounts" risk criteria score 124, risk scorer 120 identifies accounts 101, for example, by way of a unique identifier, that did not previously appear over a time period, for example, an earlier one year time frame. In an example, a unique identifier of an account can be a combination of account number, transit, currency, and view type.

In some embodiments, a risk criteria score 124 for "new accounts" for an account 101 is scored as "1" if the unique identifier of the account has never existed prior to the sampling month. If the unique identifier is identified as existing prior to a month in which an account 101 is being evaluated, a score of "0" is assigned.

Other risk criteria scores 124 based on information related to an account 101 are also contemplated.

Risk criteria scores 124 such as those disclosed herein may generate values that are on a "continuous" scale and outside a scale of 0 to 1, and it may be desirable to transform such values to scale them to between "0" and "1".

For risk criteria scores 124 that are continuous variables, in some embodiments, continuous variables are converted into scores first through a logarithmic transformation and then by being min-max scaled, which forces them to range between values of "0" and "1" inclusively.

Figure 3A:
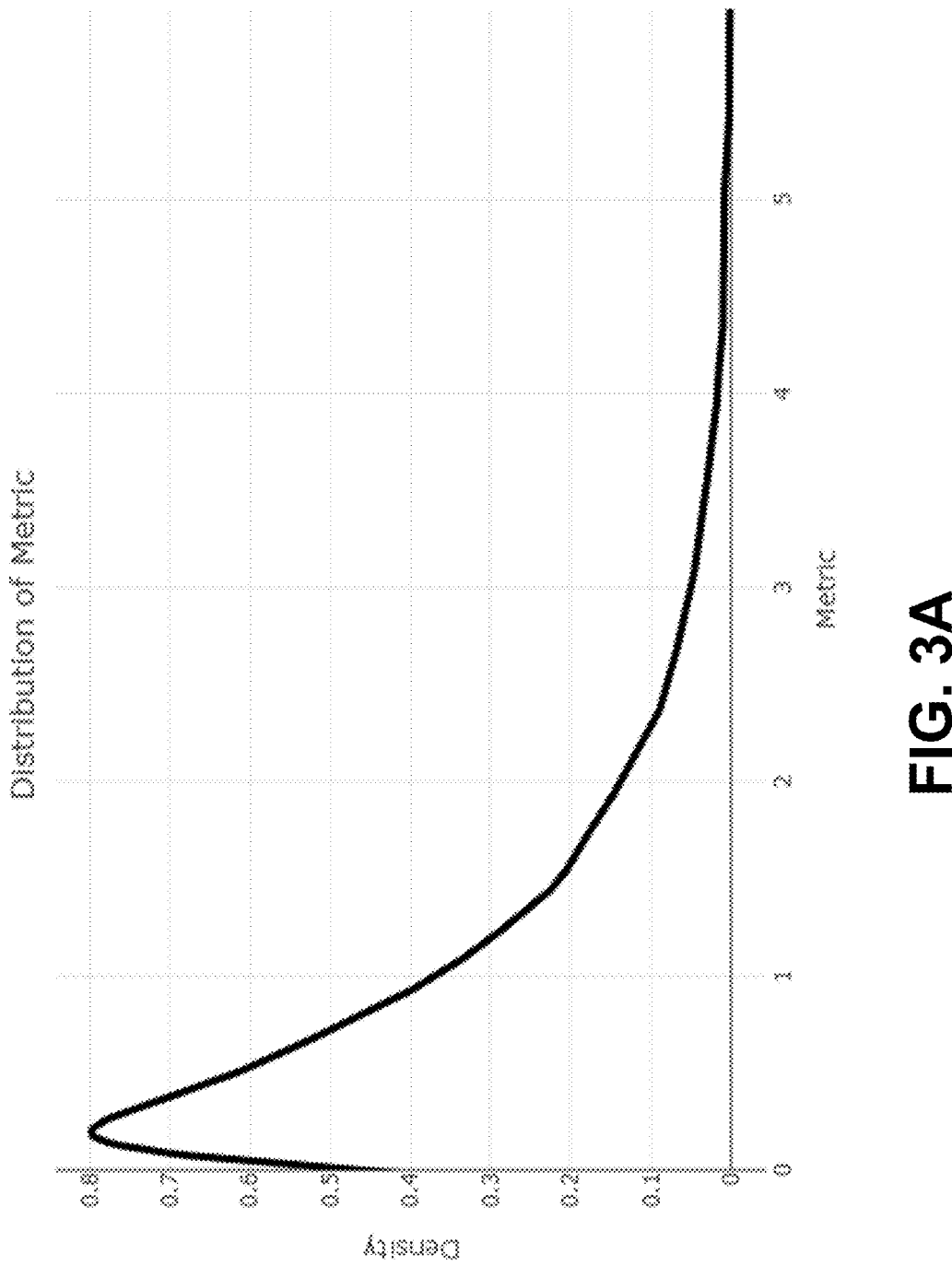
FIG. 3A illustrates an example distribution of metrics, according to an embodiment.

An example density distribution of risk criteria scores 124 across a population of accounts 101 is illustrated as a distribution of "metric" in FIG. 3A. It is not uncommon to encounter a risk metric distribution similar to FIG. 3A in the analytics found using risk assessor 100. Sometimes these distributions will contain extreme outliers, which typically corresponds to high risk entities. The same density distribution is illustrated, with 15 outliers added, in FIG. 3B.

Figure 3B:
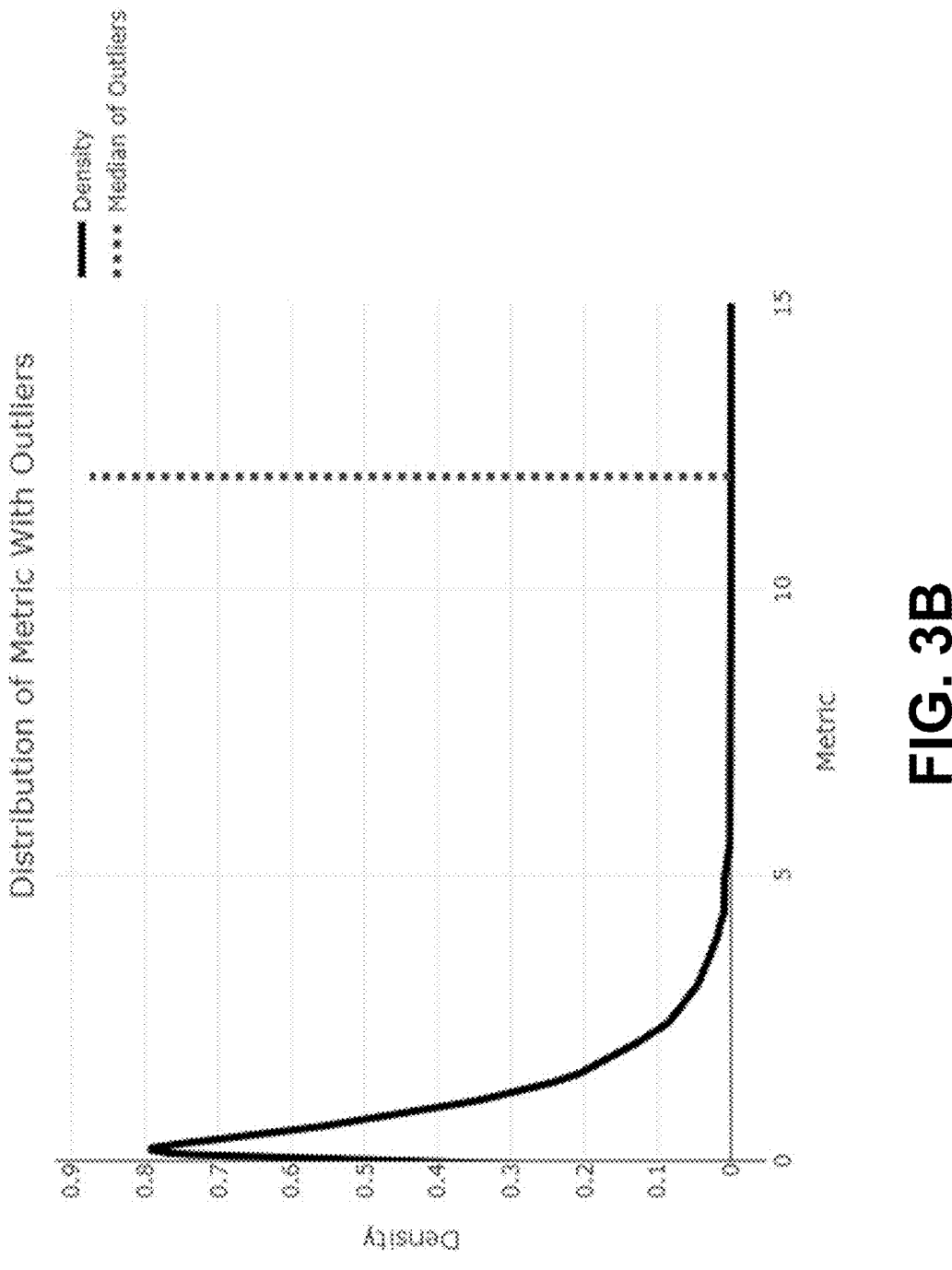
FIG. 3B illustrates the distribution of metrics of FIG. 3A, with outlier metrics added, according to an embodiment.

In order to convert metrics such as those shown in FIG. 3B, or similarly continuous risk criteria scores 124, to a normalized score, they can be forced to the same scale. This can be done through some form of normalization, such as min-max scaling. Min-max scaling can create a relative comparison of risk between all entities in the population.

In some embodiments, min-max scaling can be performed on a metric such as a risk criteria score 124 as follows:

$$min\_max\_metric=(metric-min(metric))/(max(metric)-min(metric)) \quad (1)$$

where min_max_metric is the scaled value for the metric, metric is the metric value (such as risk criteria score 124), min(metric) is the minimum value of all metrics in the distribution (for example, across a population of accounts 101), and max(metric) is the maximum value of all metrics in the distribution (for example, across a population of accounts 101).

Figure 3C:
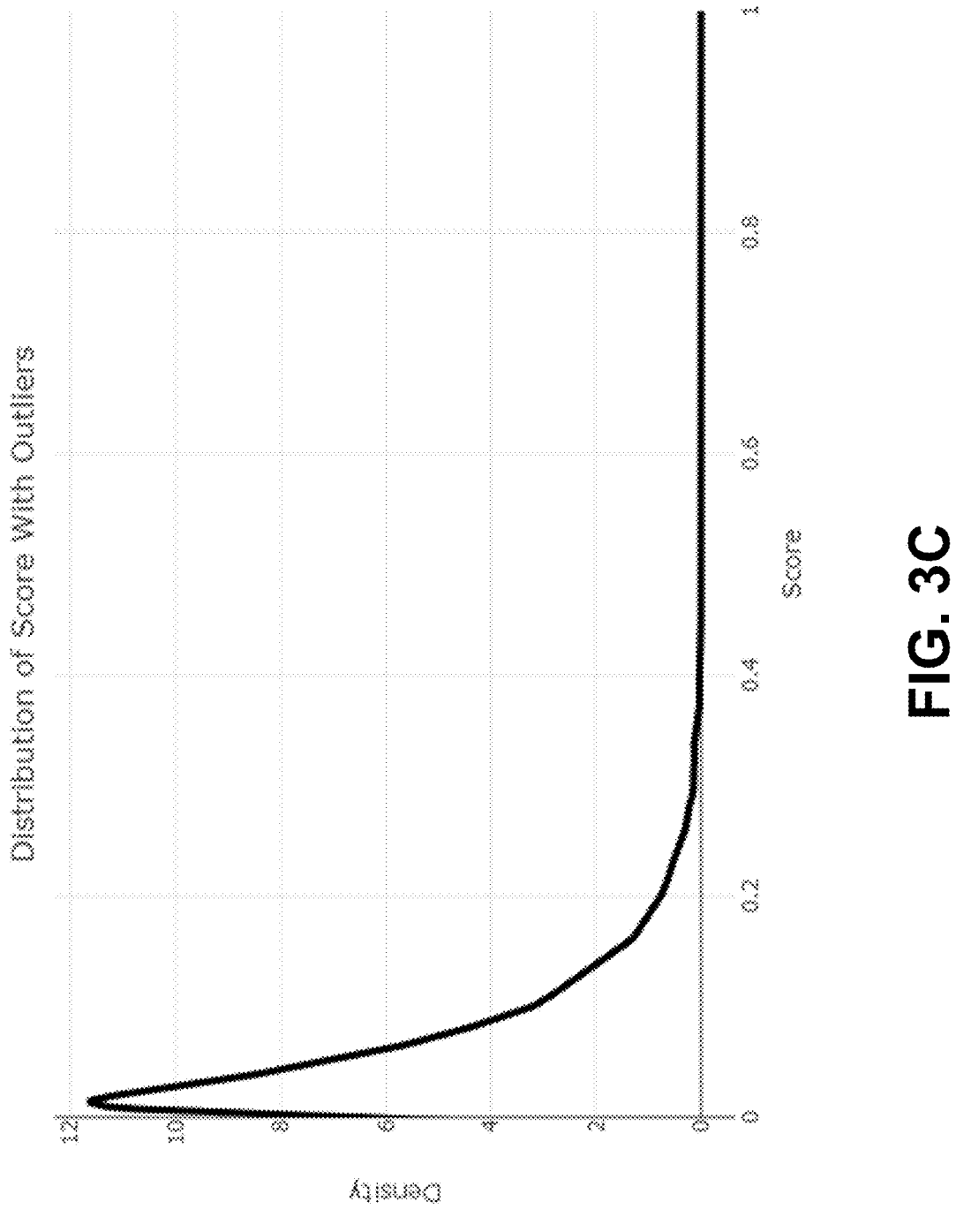
FIG. 3C illustrates a normalized distribution of the metrics of FIG. 3B, according to an embodiment.

The normalization of equation (1) forces the metric in question to scale between [0,1], as shown in FIG. 3C.

Figure 3D:
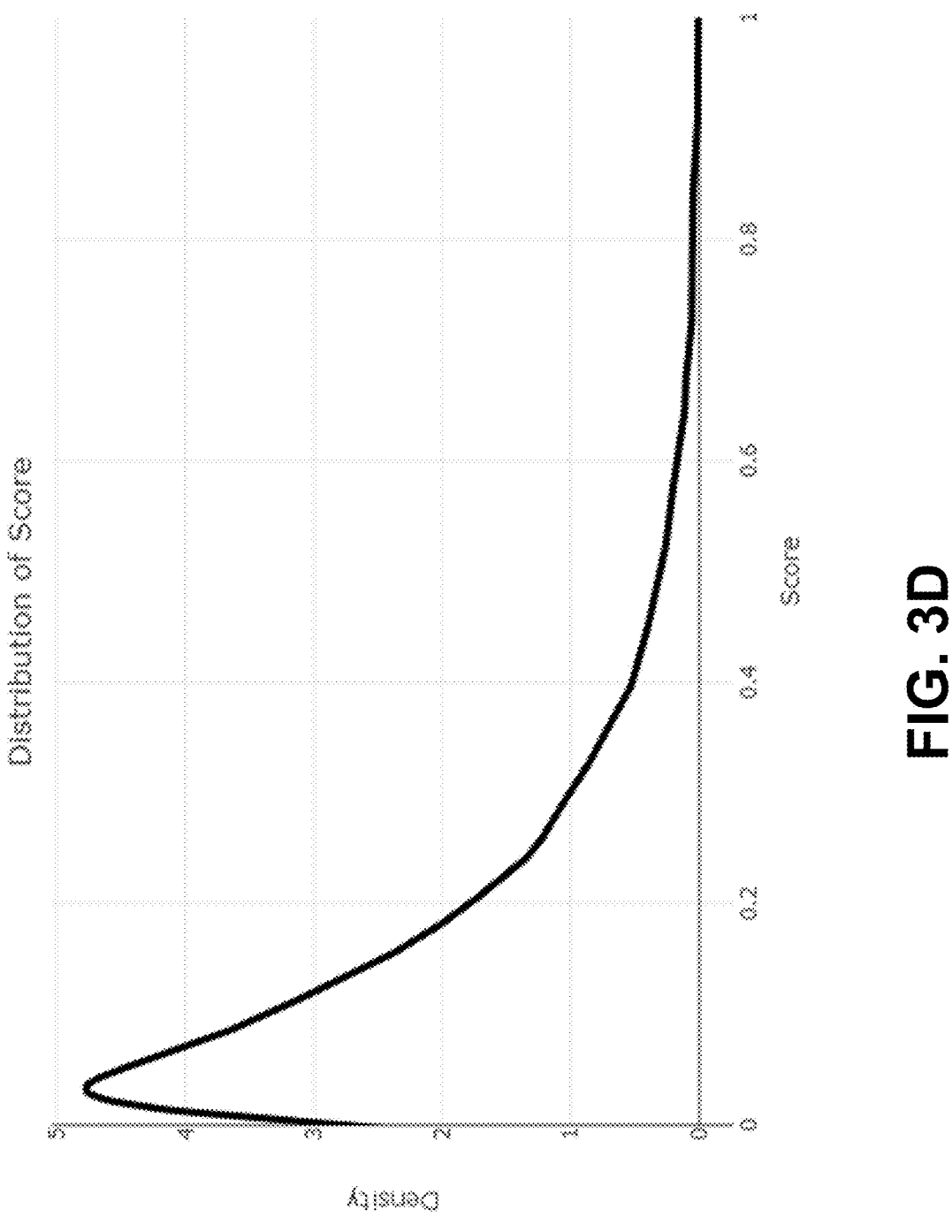
FIG. 3D illustrates a distribution of a normalized score without extreme outliers, according to an embodiment.

However, an issue with applying the form of normalization defined in equation (1) to a metric is that the outliers can force the maximum value in the min-max scaling calculation to overpower the rest of values in the metric. This issue can be encountered with only a single outlier in the population. The density distribution of a normalized score without such extreme outliers is illustrated in FIG. 3D.

Removing these outliers is not a proper solution, as it would be removing high risk entities from the population. To rectify this issue, the metric can be log transformed as below:

$$log\_metric=log(metric+1) \quad (2)$$

where log_metric is the logarithmic transformed value for the metric, log( ) is a logarithmic function, and metric is the metric value.

Figure 3E:
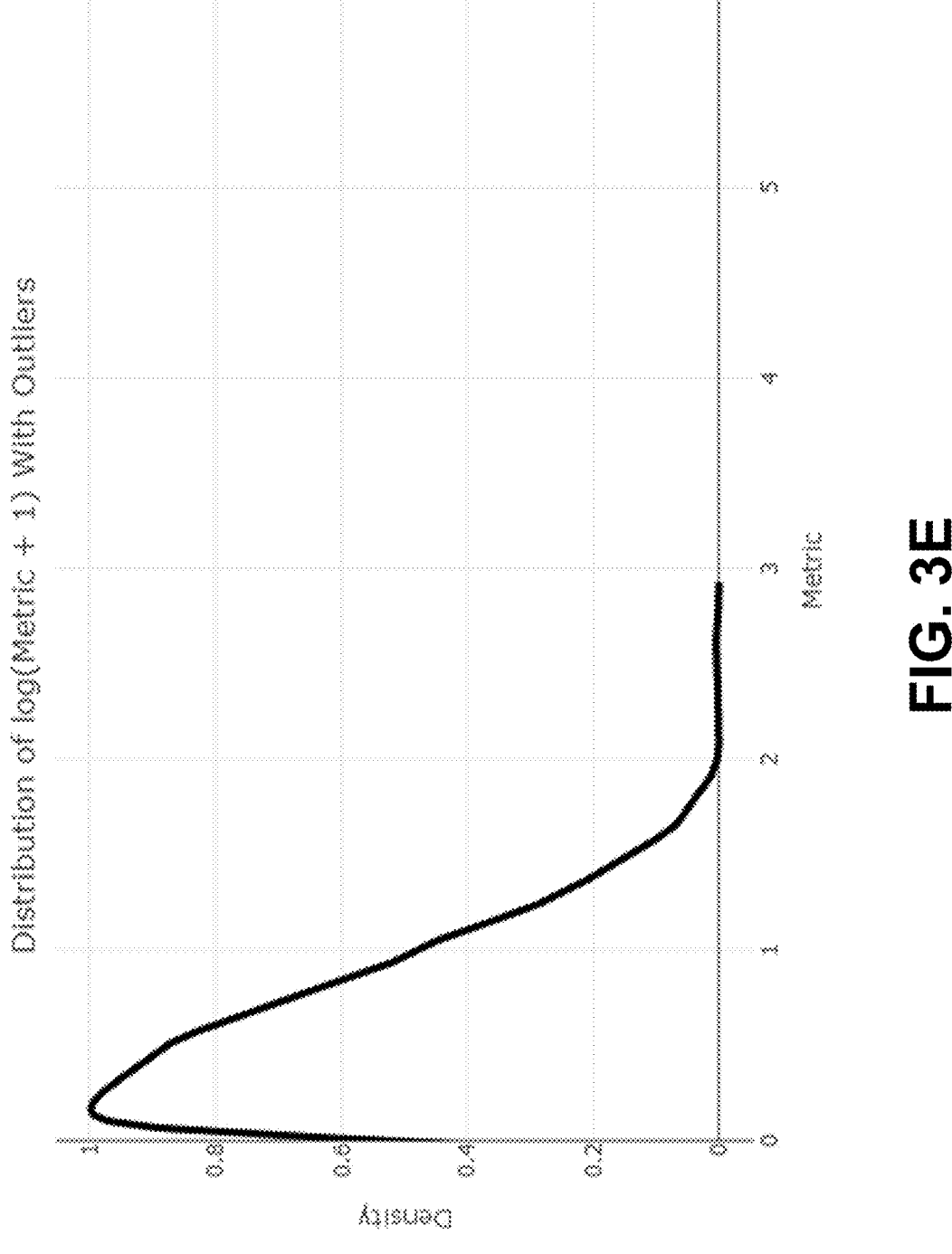
FIG. 3E illustrates a distribution of logarithmic transformations, according to an embodiment.
Figure 3F:
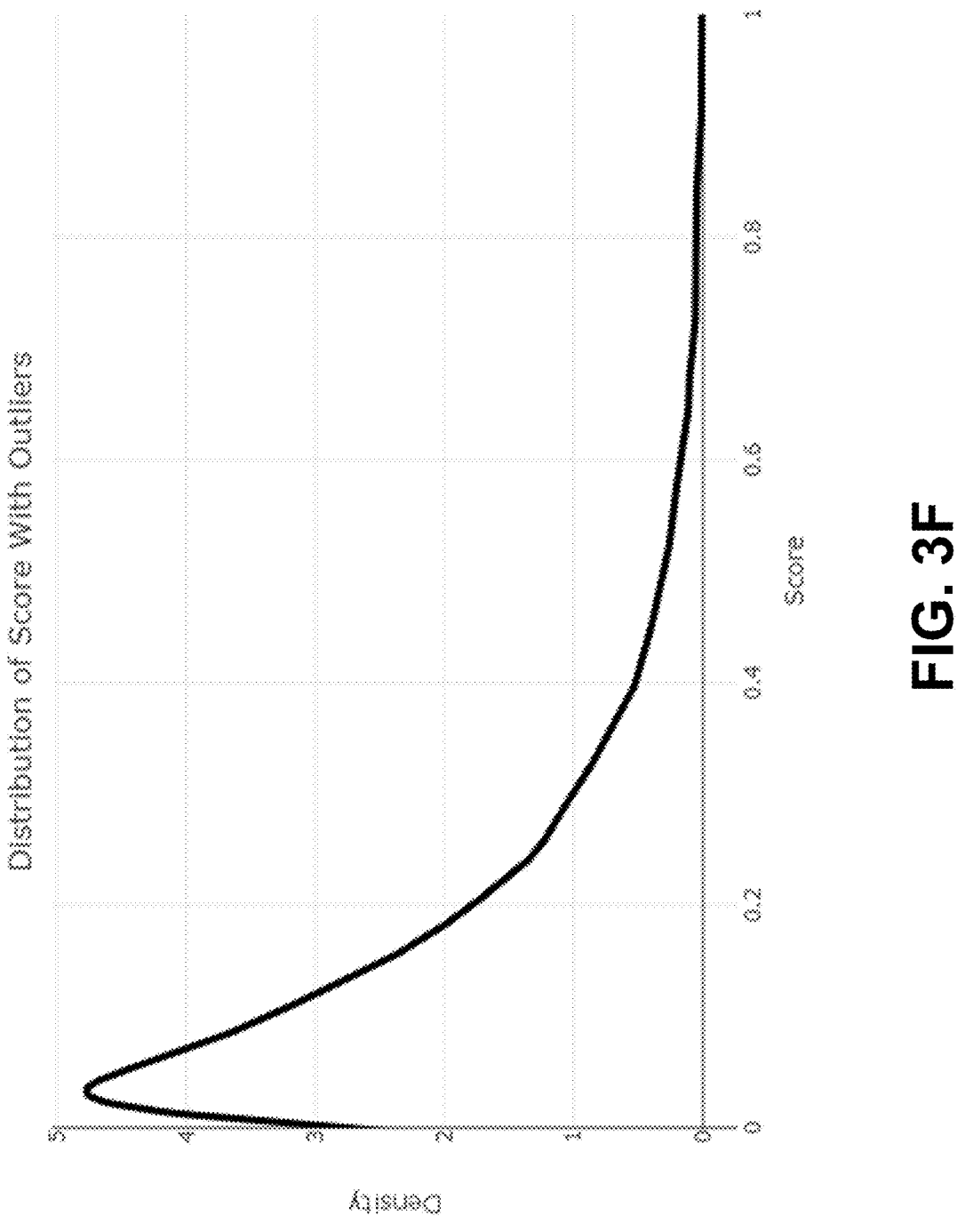
FIG. 3F illustrates a distribution of min-max scores applied to the logarithmic transformation of FIG. 3E, according to an embodiment.

A logarithmic transformation such as that shown in equation (2) can reduce the impact of outliers on the distribution, as shown in the distribution of logarithmic transformation in FIG. 3E and the distribution of min-max scores applied to the logarithmic transformation, shown in FIG. 3F.

As shown in FIG. 3F, the score can now properly take the outliers into consideration without impacting the rest of the distribution.

In the event a continuous metric contains negative values, the log transformation can be modified as below:

$$log\_metric=log(metric+abs(min(metric))+1) \quad (3)$$

where abs( ) is an absolute value function.

Binary variables may be left as-is due to the fact that they already range between "0" and "1".

The risk criteria scores 124 for an account 101 may be summed by risk scorer 120 to determine a total or composite risk score 126 for each account 101.

In some embodiments, a composite risk score 126 for an account 101 is based on a weighted summation of one or more risk criteria scores 124 for various risk criteria 122.

In some embodiments, a composite risk score 126 for an account 101 is based on a weighting factor applied to each of the risk criteria scores 124 of that account 101, and the weighted risk criteria scores 124 can then be summed.

Example weighting factors for risk criteria scores 124 of various risk criteria 122 are provided in the table below:

| Risk Criteria 122 | Weighting Factor for Risk Criteria Score 124 |
|---|---|
| "Changing Attestations" | 1.0 |
| "Pending Approvals" | 1.0 |
| "Static Balances" | 2/3 |
| "Changing Preparer and Approving Manager Combination" | 1/3 |
| "Account Balance Outlier" | 1/3 |
| "Illogical Balances" | 0.1 |
| "Other than Fully Reconciled— No Comment" | 1.0 |
| "Fully Reconciled—Outstanding Difference" | 5.0 |
| "New Accounts" | 1.0 |

Weighting factors may be determined based on a distribution of risk criteria scores 124 in a population of accounts 101. A "population" can refer to the statistical definition. Population statistics can be done on the entire population (for example, of accounts) instead of a sample. In some embodiments, risk scorer 120 processes every single account available, which may be advantageous. Since these statistics (risk criteria scores 124 and weighted and summed as composite risk scores 126 for accounts 101) are not being calculated on a sample but the entire population, there may be a smaller or no degree of error as compared to a statistic on a sample, which is a representation of the population and not the population itself, and said statistic will have a degree of error associated with it.

In some embodiments, weights can be automatically assigned to each score presented in the weighted summation to form composite risk score 126.

It will be understood that some or all of the risk criteria scores 124 may be added to form a composite risk score 126 for an account 101.

A composite risk score 126 for an account 101 may be joined with the account record 111 data for that account 101, and stored in data store 160. A composite risk score 126 can be stored and added as a variable in that account record 111 as shown by way of example in FIG. 10 as "Score Total".

Balance thresholder 130 can be configured to determine a "materiality" of an account 101, which can be used to designate accounts to be sampled by analyzer 140.

Accounts 101 may be flagged as "material" based on whether the balance of the account 101 exceeds a balance threshold 132. A balance threshold 132 can be determined for a category of accounts, or account grouping. Groupings can include, for example, "Goodwill", "Trading Securities", "Other Liabilities", and "Cash and due from banks".

To determine a balance threshold 132 for an account grouping, in some embodiments, balance thresholder 130 determines a median value for the balances of all accounts in the account grouping.

Balances of all the accounts 101 in the account grouping are distributed into quantiles. In an example, balances of the accounts 101 in the account grouping can be distributed into quantiles, namely, the data set of balances divided by a lower quartile Q1 (the middle value between the minimum value and the median value of the data set), a median quartile Q2 (the median value of the data set) and an upper quartile Q3 (the middle value between the median value and the maximum value of the data set).

An interquartile range IQR can be defined as the difference between upper quartile Q3 and lower quartile Q1.

A balance threshold 132 for an account grouping can thus be defined as Q3+1.5×IQR. Any account that has a balance above the balance threshold for its particular account grouping may be flagged as "material" for sampling purposes as discussed further below.

Figure 4:
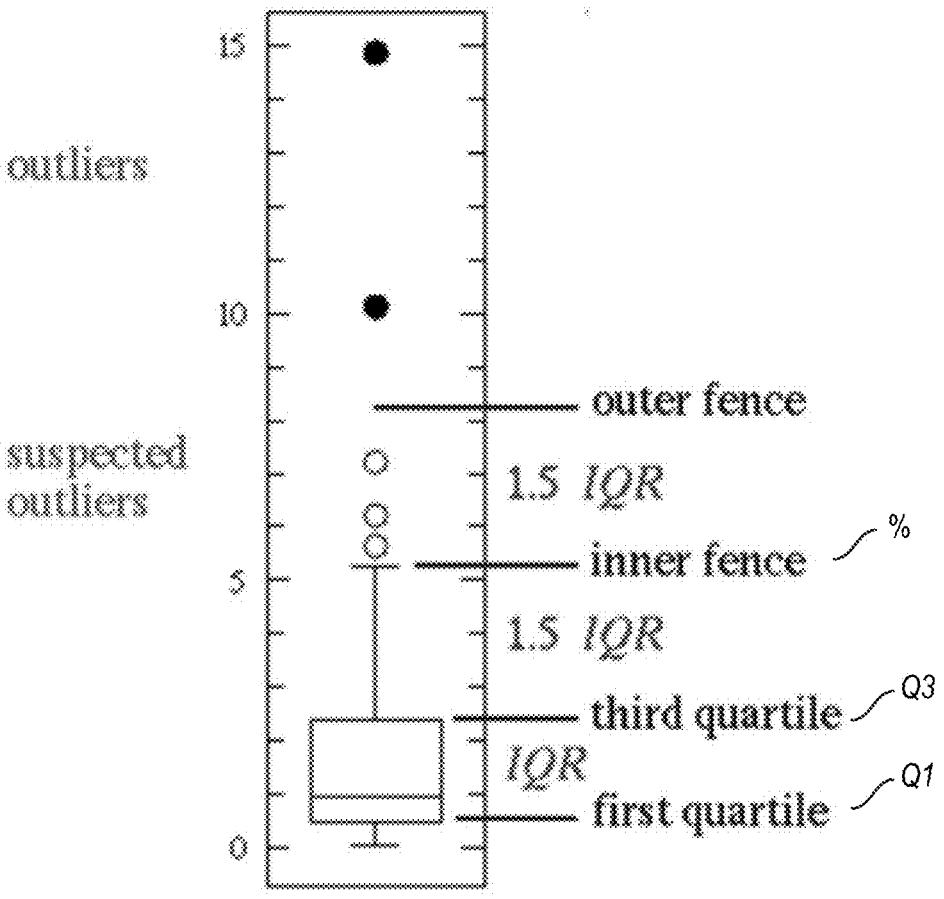
FIG. 4 is a boxplot diagram of a quartile distribution of account balance values, according to an embodiment.

FIG. 4 is a boxplot diagram of a quartile distribution of account balance values (the values scaled between zero and 15 for illustration purposes), according to an embodiment, showing Q1 ("first quartile"), Q3 ("third quartile"), a balance threshold 132 as an "inner fence", and an "outer fence" to which an additional 1.5×IQR is added. Data points (representing, for example, balance values for accounts within an account grouping) are identified as "suspected outliers" and "outliers" when greater than balance threshold %, and may result in the account having those balance values being flagged as "material".

A "material" flag for an account may be joined with the account record 111 data for that account, and stored in data store 160.

Analyzer 140 can select accounts 101 for sampling, in some embodiments, by determining a distribution of composite risk scores 126 and selecting high risk accounts 101. Sampling can involve identifying accounts 101 for audit, further analysis, review, or testing, in some embodiments, due to an identified risk.

Analyzer may generated a ranked list, ranking composite risk scores 126 of the accounts 101, as determined by risk scorer 120, from highest composite risk score 126 to lowest composite risk score 126, with a higher composite risk score 126 taking precedence when it comes to audit sample selection.

Analyzer 140 may generate a density distribution of composite risk scores 126 for each account may be compared across an entire population of accounts 101. A distribution may be taken across a particular population, such as a geographical region or a selected number of accounts.

In some embodiments, analyzer 140 may distribute composite risk scores 126 in a normal distribution.

Accounts 101 may be quantiled, as a form of triaging, into "risk buckets" as high risk (upper quartile of distribution), medium risk (interquartile range (IQR)), or low risk (lower quartile).

Quantiles can be calculated for the composite risk scores 124 of accounts 101, and thresholds for risk ratings (or "risk buckets"), such as "low", "medium", or "high", calculated in order to assign said risk ratings to every entity in the audit population.

Quantiles can be defined as cut points that divide a probability distribution. For example, if the 25th percent quantile was estimated, it would be expected that 25% of the data would be lower than this value, and 75% of the data would be higher than it.

A quartile is an alternative naming convention that refers to quantiles that cut the associated data into quarters. For instance, the 25th percent, 50th percent, and 75th percent quantiles are referred to as the first, second and third quartiles (Q1, Q2, Q3). The inter-quartile range (IQR) is defined as Q3−Q1, and can be multiplied by a factor, then added to Q3 in order to determine an outlier threshold.

Risk ratings can be assigned to composite risk scores 124, and hence the associated accounts 101, as follows: generating a distribution of the composite risk scores 124; calculating Q1; calculating Q3; calculating the IQR (Q3−Q1); assigning any composite risk scores 124 less than or equal to Q3 as "low risk"; assigning any composite risk scores 124 between Q3 and Q3+c×IQR as "medium risk", where c is a weighted factor that determines how extreme the outlier threshold is; and assigning any composite risk sores 124 greater than or equal to Q3+c×IQR as "high risk".

Since these statistics are not being calculated on a sample but the entire population, there may be a smaller or no degree of error as compared to a statistic on a sample, which is a representation of the population and not the population itself, and said statistic will have a degree of error associated with it.

In some embodiments, the threshold weight c can be automatically assigned.

Figure 5:
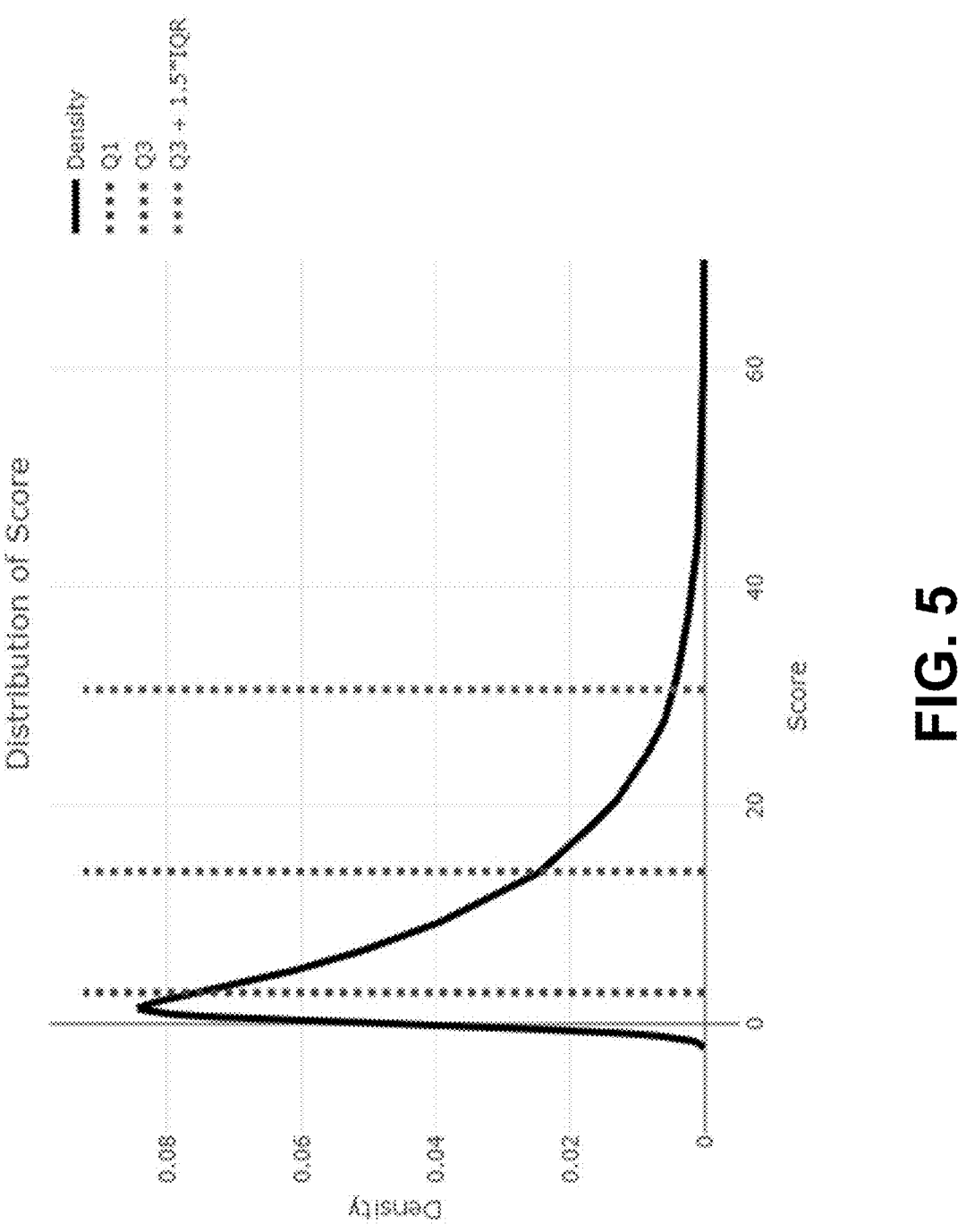
FIG. 5 illustrates a simulated distribution of composite risk scores and risk rating determination, according to an embodiment.

An example risk rating determination on simulated data for a distribution of composite risk scores is illustrated in FIG. 5.

In some embodiments, thresholds of composite risk scores 126 are not defined, and accounts are sampled or flagged for review if falling outside of a normal distribution.

Audit samples can be automatically selected by flagging the entities (accounts 101) in the audit population that are associated with the highest composite risk scores 126, in an example, based on an identification of high risk scores, and thus accounts, using techniques disclosed herein. The size of the audit sample can be defined by an auditor.

Accounts may be selected or sampled for audit from a ranked list of accounts 101, in an example, to be flagged for review or testing, based on a selection of accounts 101 with high composite risk scores 126, or with composite risk sores 126 falling outside of a certain distribution. In some embodiments, accounts are selected based on whether the account has been flagged as "material" by balance thresholder 130, with "material" flagged accounts selected for review or testing.

In an example, 25 accounts 101 may be sampled each quarter, and a certain number of accounts 101 sampled per month for analysis by analyzer 140. The sample size taken can be specified by the auditor prior to risk assessor 100 being run. The sample size may be dependent on an auditor's work load and capacity to review the samples. An audit sample map (in an example, an Excel file) may be used for auditors to enter in a number of how many samples they would like to review for a given month in the year. They can change these numbers any time before risk assessor 100 runs and it will account for any changes made in the file automatically.

In some embodiments, accounts 101 with statuses such as Not Reconciled", "Request Reassignment" and "No Response" will be excluded from sampling by analyzer 140 as these accounts have already been flagged to inform management. Accounts 101 with statuses "Fully Reconciled", "Reconciled with Exceptions", "Reconciled with Process Issues" may be targeted for sampling purposes.

In some embodiments, an entire population of accounts 101 can be considered during selection of "samples", ensuring that they are chosen across the enterprise, and an appropriate amount are selected from each region, based on overall population size within each geographic region.

In some embodiments, accounts 101 may sampled from a particular geographical region of an entire population of accounts.

In an example, account record 111 data for each account 101 may include transit number information. Based on a transit number, analyzer 140 can determine country information for an account, such as an associated country code (for example, "US") as well as full country name (for example, "United States"), and this information can be saved in a suitable Excel file or database, such as in data store 160, and may be updated on a regular basis, such as yearly.

Country information for an account may be joined with the account record 111 data for that account 101, and stored in data store 160.

Account records 111, as well as composite risk scores 126, "material" flags and other information related to account 101, can be filtered by country or region.

In some embodiments, account records 111 may be examined for a particular region. If there are no high risk accounts flagged as "material", accounts 101 that do not have an account record 11 flagged as "material" but are "high risk" may be selected for review or testing. A flagging of an account 101 as "high risk" may be performed using techniques disclosed herein, and may be based at least in part on a threshold set by the application of quantiles on composite risk scores 126. A high composite risk score 126 is sometimes referred to as having "higher risk", as it is a continuous measurement of risk. By extension, high values for composite risk score 126 will very likely translate into a risk rating of "high".

In some embodiments, certain geographic regions have region-specific thresholds for account balances, which may supersede the balance thresholds of balance thresholder 130 (and may be lower than the balance thresholds of balance thresholder 130) in identifying "material" accounts 101 for further review or testing.

In some embodiments, accounts 101 may sampled across regions for a population of accounts, such that a minimum number of accounts 101 are sampled from each relevant region. Such sampling can cover worldwide regions including non-Canadian regions.

In an example, the following minimum samples may be selected from the following regions: minimum 1 sample from Caribbean (codes: TT, BS, TC, KY, SX, AW, VC, KN, GD, CW, BB, AG), minimum 1 sample from Luxemburg (code LU), minimum 1 sample from Great Britain (code GB), minimum 1 sample from Asia-Pacific (APAC) (codes: AU, HK, SG, CN, JP, KR, MY, TW, BN, IN), and minimum 2 samples from United States (code US).

For accounts that are sampled or selected by analyzer 140 for review or testing, a request may be sent to a preparer or reviewer of the account for information such as an explanation of the purpose of the account and evidence of a reconciliation.

The purpose of the account 101 may be evaluated to determine if the purpose is reasonable or not. In some embodiments, an auditor will do a quick evaluation to confirm that the purpose of the account is reasonable and understood. For example, an account owned by an approver should have a benchmark for the size and rate of transactions that flow through the account.

A reconciliation can be performed on an account record 111 to determine if a source balance matches a balance in the account record 111, on the basis of various parameters such as amount, sign, currency, account number, transit, and the like. Individuals on a reconciliation team can perform rec-onciliations (the individuals being audited by risk assessor 100). The individuals attest to whether an account is fully reconciled. If an account is not fully reconciled, they have to attest as such and provide a reason as to why this is not the case. A "source value" is unmodified data that is ingested. All data is source data unless otherwise specified, such as feature engineered variables that depend on the source data.

In some embodiments, analyzer 140 automatically selects high risk account records 111 from the sampled accounts using statistics, and communication such as email may be automatically sent to approving managers of the selected accounts and automatically send follow-up on a regularly basis, such as weekly.

An account may be classified as low, medium or high risk, using techniques disclosed herein, in an example, a threshold set by the use of quantiles on composite risk scores 126. A sample can be selected based on accounts 101 in the population with the highest composite risk score 126. In an example, if the sample size was 10 units, analyzer 140 would select 10 accounts with the highest composite risk scores 126 in the population. This methodology changes slightly when region requirements are imposed, as the sample is forced to contain accounts from certain geographical regions; in this instance, accounts 101 sampled would be the accounts from a particular geographical region with the highest composite risk score 126.

A sampling matrix and template (such as an excel spreadsheet) may be generated for use by auditors in order to document their findings while conducting an audit. Empty templates and matrices are constructed automatically by this process for the auditors to fill out when conducting their audits.

Data generated by risk assessor 100, such as accounts selected for further audit, may be synced to a table on a MS SQL server for consumption by auditors.

Data generated by risk assessor, such as analytics performed by analyzer 140, may be reported in a suitable manner such as by way of reports including data and visualizations generated by report generator 150.

In some embodiments, reports are provided as an interactive dashboard, for example, using Tableau Software or a suitable dashboard software.

Figure 6A:
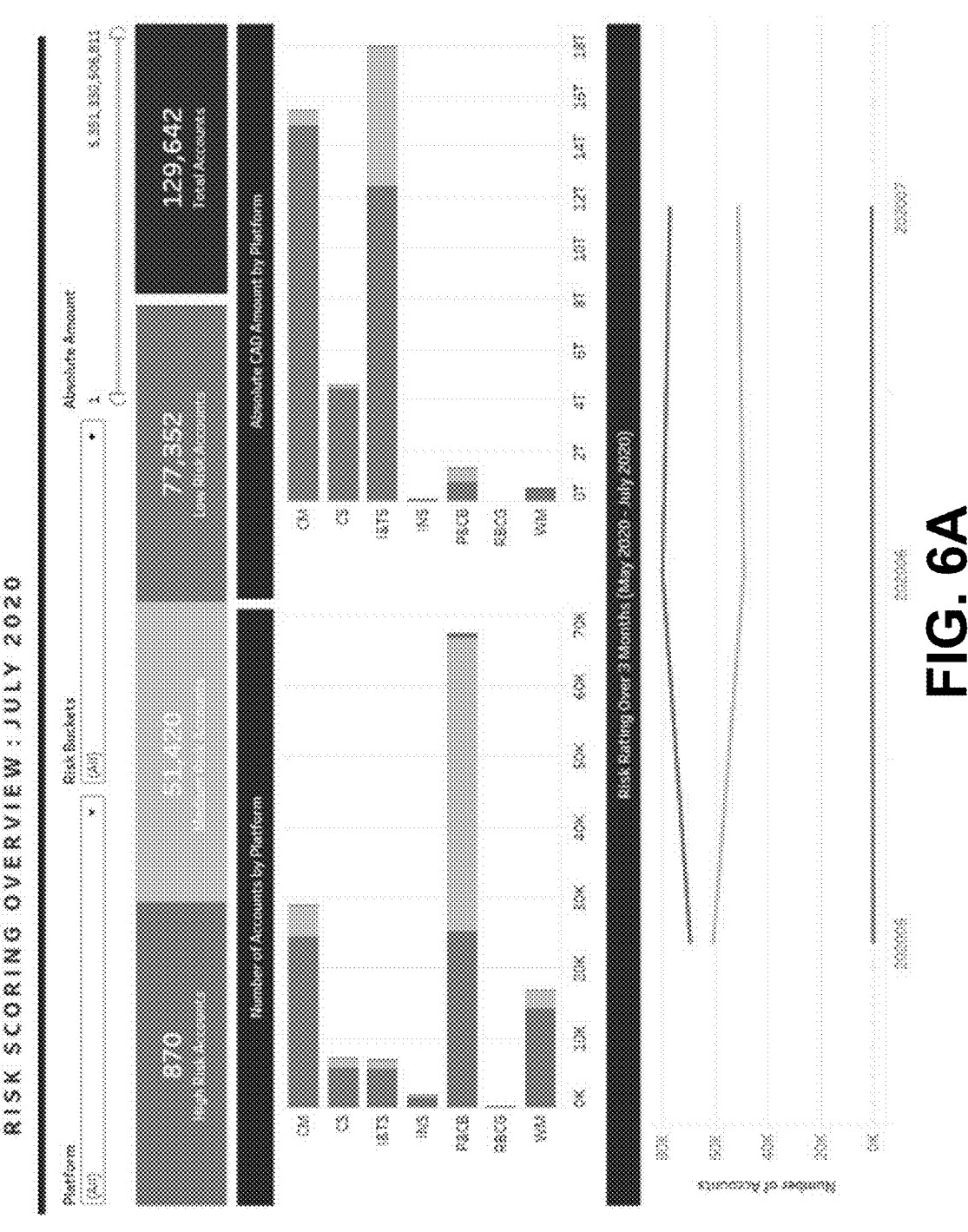
FIGS. 6A-6C are screenshots of dashboard interfaces, according to embodiments.
Figure 6B:
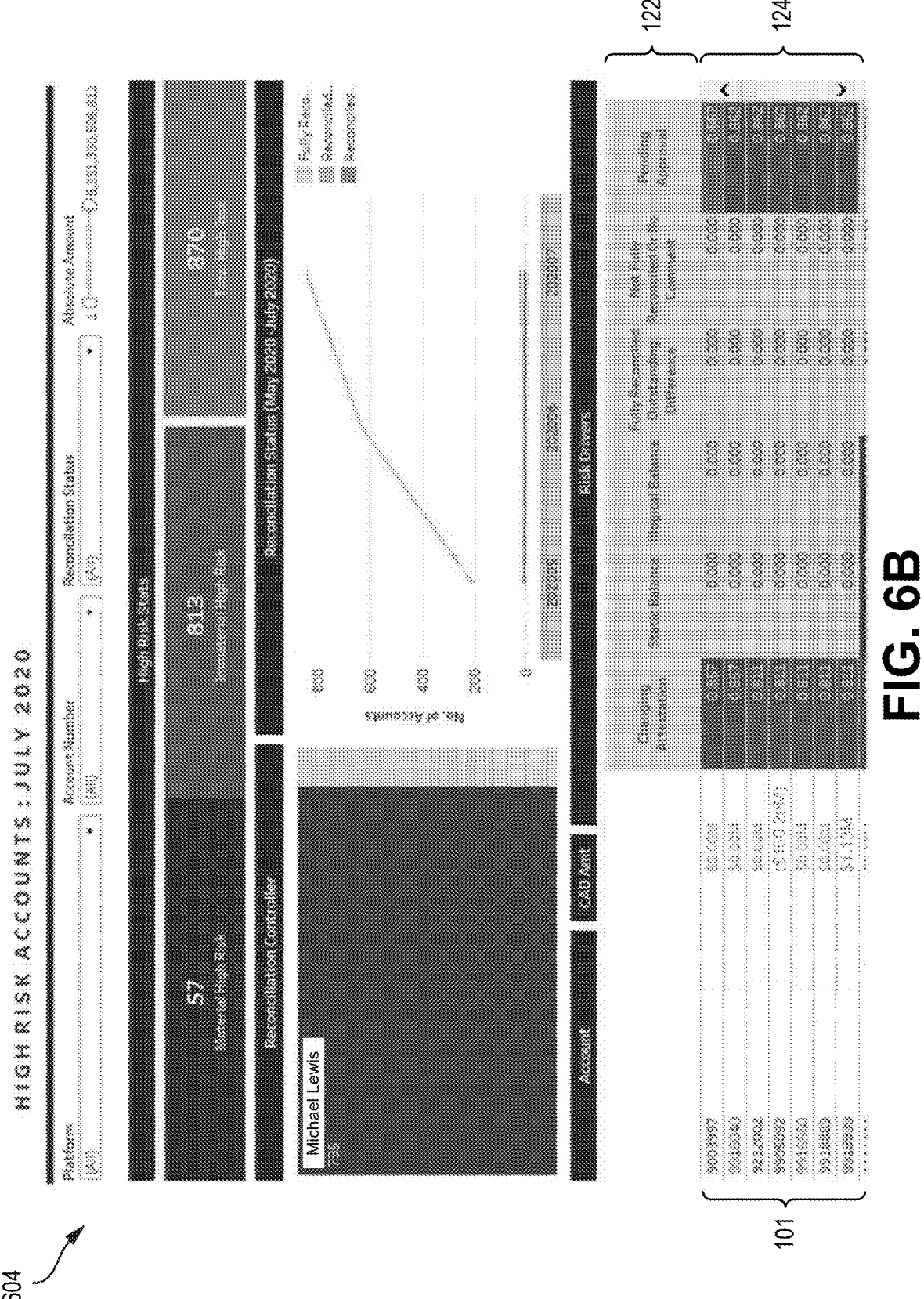
Figure 6C:
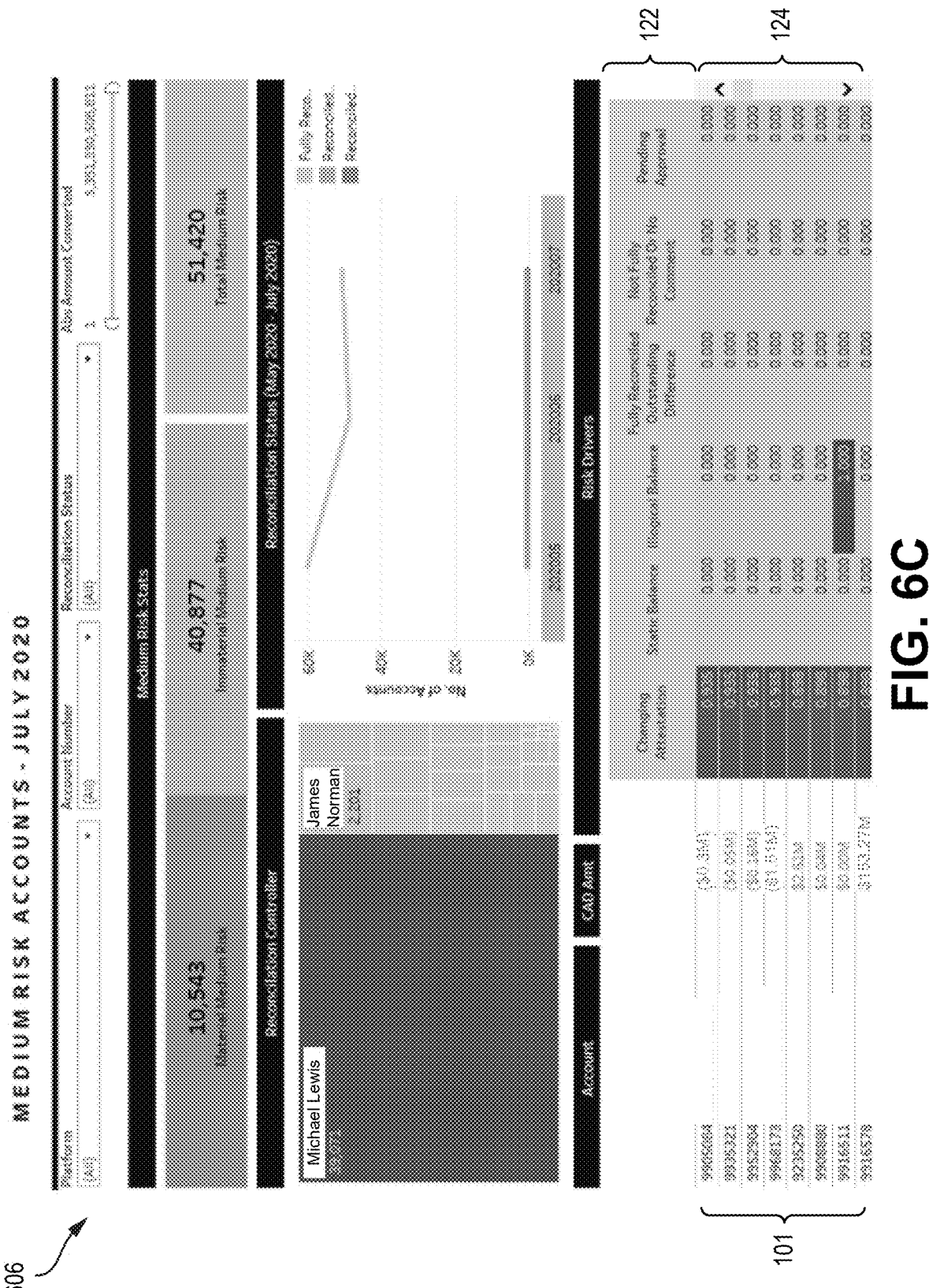

FIGS. 6A-6C are screenshots of dashboard interfaces, according to embodiments, generated by report generator 150 for reporting and visualizing data generated by risk assessor 100.

FIG. 6A illustrates a screenshot of a risk scoring overview dashboard 602 generated by report generator 150 and displayed on a Tableau dashboard view, according to an embodiment.

As shown in FIG. 6A, dashboard 602 can filter visualizations by "Platform", "Risk Buckets", and an "Absolute Amount" range between "1" and "5,351,330,506,811".

Dashboard 602 illustrates "risk buckets", designated as each of "High Risk Accounts", "Medium Risk Accounts", and "Low Risk Accounts". Dashboard 602 displays the count of accounts 101 within the various risk buckets for "High Risk Accounts", "Medium Risk Accounts" and "Low Risk Accounts" for a specific month. "Total Accounts" displays all the accounts 101 within these buckets. Based on the risk scoring by risk scorer 120 and analysis performed by analyzer 140, accounts 101 are grouped into high risk, medium risk and low risk.

Dashboard 602 further illustrates statistics for the "risk buckets", including "Number of Accounts by Platform", a breakdown by platform illustrated as a horizontal bar graph displaying the number of accounts based on the platform within various risk buckets, "Absolute CAD Amount by Platform", a horizontal bar graph displaying the absolute CAD amount of the accounts by platform within various risk buckets, and "Risk Rating Over 3 Months (May 2020-July 2020)", a count of journals by risk bucket illustrated as a line graph depicting the number of accounts over a three month period of time within the various risk buckets.

FIG. 6B illustrates a screenshot of a high risk accounts dashboard 604 generated by report generator 150 and displayed on a Tableau dashboard view, according to an embodiment.

As shown in FIG. 6B, dashboard 604 can filter visualizations by "Platform", "Account Number", "Reconciliation Status" and an "Absolute Amount" range between "1" and "5,351,330,506,811".

Dashboard 604 illustrates "High Risk Stats", risk bucket statistics for the number count for accounts designated as high risk, for example, based on the risk scoring by risk scorer 120 and analysis performed by analyzer 140, and the numbers depicted further separate the high risk accounts into "material" high risk ("Material High Risk") and "immaterial" high risk ("Immaterial High Risk") for a specific month, and a total count for high risk accounts ("Total High Risk"). Materiality (to flag an account as "material" or not/"immaterial") can be determined for accounts by balance thresholder 130.

"Reconciliation Controller" in dashboard 604 illustrates a tree map depicting the top Reconciliation Controllers of the high risk accounts, categorized based on the number of accounts.

"Reconciliation Status (May 2020-July 2020)" is a graph depicting the number of high risk accounts based on the reconciliation status over a period of three months.

Dashboard 604 further illustrates a table of "Risk Drivers" for accounts 101 identified by "Account" and the Canadian dollar balance amount "CAD Amt" columns. The table depicts the breakdown of the risk drivers (risk criteria scores 124 for risk criteria 122 such as "Changing Attestation", "Static Balance", "Illogical Balance", "Fully Reconciled Outstanding Difference", "Not Fully Reconciled Or No Comment", and "Pending Approval") for each of the high risk accounts identified by account, unit number, currency and view type.

FIG. 6C illustrates a screenshot of a medium risk accounts dashboard 606 generated by report generator 150 and displayed on a Tableau dashboard view, according to an embodiment.

As shown in FIG. 6C, dashboard 606 can filter visualizations by "Platform", "Account Number", "Reconciliation Status" and an "Abs Amount Converted" range between "1" and "5,351,330,506,811".

Dashboard 606 illustrates "Medium Risk Stats", risk bucket statistics for the number count for accounts designated as medium risk, for example, based on the risk scoring by risk scorer 120 and analysis performed by analyzer 140, and the numbers depicted further separate the medium risk accounts into "material" high risk ("Material Medium Risk") and "immaterial" high risk ("Immaterial Medium Risk") for a specific month, and a total count for medium risk accounts ("Total Medium Risk"). Materiality (to flag an account as "material" or not/"immaterial") can be determined for accounts by balance thresholder 130.

"Reconciliation Controller" in dashboard 606 illustrates a tree map depicting the top Reconciliation Controllers of the medium risk accounts, categorized based on the number of accounts.

"Reconciliation Status (May 2020-July 2020)" is a graph depicting the number of medium risk accounts based on the reconciliation status over a period of three months.

Dashboard 606 further illustrates a table of "Risk Drivers" for accounts 101 identified by "Account" and the Canadian dollar balance amount "CAD Amt" columns. The table depicts the breakdown of the risk drivers (risk criteria scores 124 for risk criteria 122 such as "Changing Attestation", "Static Balance", "Illogical Balance", "Fully Reconciled Outstanding Difference", "Not Fully Reconciled Or No Comment", and "Pending Approval") for each of the medium risk accounts identified by account, unit number, currency and view type.

In some embodiments, a platform overview of number of accounts dashboard can be generated by report generator 150 and displayed on a Tableau dashboard view, and filter visualizations by "Platform", and "Country Name". The dashboard can illustrate a graph depicting the number of accounts per month, represented as a vertical bar, and within each vertical bar of the graph, the platform of the accounts within the month are represented.

In some embodiments, a platform overview of an absolute balance dashboard can be generated by report generator 150 and displayed on a Tableau dashboard view, and filter visualizations by "Platform", and "Country Name". The dashboard can illustrate an "Absolute Balance (GV7 in CAD $)" graph, a journal volume graph depicting a GV7 absolute balance of the accounts per month, each month represented as a vertical bar. Within each vertical bar, the platform the accounts are booked to are represented.

As used herein, "GV" stands for global view, which can be used to define specific reporting deadlines within an enterprise and is assigned to certain days within a month. This schedule may be set in advance, and may lack consistency. The "GV7" values illustrated in a dashboard can be the values associated with an account collected on the GV7 reporting day. Similar reporting days include a GV3 reporting day.

In some embodiments, a platform overview of balance by eGL type dashboard can be generated by report generator 150 and displayed on a Tableau dashboard view, where "eGL" is another way to classify accounts within the population. The dashboard can filter visualizations by "Platform", and "Country Name", and illustrate a "Balance (GV 7 in CAD$) by eGL Type" graph, depicting the GV7 account balance based on the eGL account type over time, along with a month-over-month percentage change "MoM Change %".

In some embodiments, a sign-off description dashboard can be generated by report generator 150 and displayed on a Tableau dashboard view. The dashboard can filter visualizations by "Platform", "Sign Off Description" and "Country Name" and illustrate a "Sign-off Description" graph, depicting a total number of accounts 101 based on the sign off description each month over time.

In some embodiments, a sign-off status dashboard can be generated by report generator 150 and displayed on a Tableau dashboard view. The dashboard can filter visualizations by "Platform", "Sign Off Description" and "Country Name", and illustrate a "Status Name" graph depicting the a number of accounts 101 based on the sign off status each month over time.

In some embodiments, a P&L impacts dashboard can be generated by report generator 150 and displayed on a Tableau dashboard view. The dashboard can filter visualizations by "Platform" and "Country Name", and illustrate an "Outstanding Difference vs P&L Impacts" graph depicting the total number of accounts 101 based on the sign off status each month over time. A top line graph represents the outstanding difference amount in CAD over the months of January to December. A bottom graph represents the profit and loss adjustment amount over time. Both of the line graphs are categorized by the different platforms.

In some embodiments, a top sign-offs dashboard can be generated by report generator 150 and displayed on a Tableau dashboard view. The dashboard can filter visualizations by "Top x Parameter", "Platform", "Country Name", and "Month". A "Top Controller" tree map depicts the top Controllers based on the number of accounts 101. A "Top Group Heads" tree map depicts the top Group Heads based on the number of accounts 101. A "Top Approving Managers" tree map depicts the top Approving Managers based on the number of accounts 101. A "Top Preparers" tree map depicts the top Preparers based on the number of accounts 101.

In some embodiments, a suspense accounts by platform dashboard can be generated by report generator 150 and displayed on a Tableau dashboard view. The dashboard can filter visualizations by "Platform", "RLN_name" and "Country Name". "RLN" can be a classification of accounts used to stratify the population of accounts and is effectively another variable by which statistics can be summarized, in particular, RLN can stand for "reporting line number", and it represents financial reporting line items (e.g., cash, accounts receivable, loans) that appear on financial statements. RLN classifications can be used to book financial transactions to the relevant category and/or line item within an eGL account. eGL refers to general ledger, and is the electronic record keeping system for an enterprise's financial data and represents all active account numbers. eGL type refers to the type of account, and examples includes assets, liabilities and intercompany. The dashboard can illustrate a "Percentage of Suspense Accounts by Platform" horizontal bar graph, depicting the percentage of suspense accounts based on each platform organized from the highest percentage to the lowest. A "Details" table provides a breakdown of additional information with regards to the platform, RLN name, unit number and the absolute value of the balance.

In some embodiments, a static balances dashboard can be generated by report generator 150 and displayed on a Tableau dashboard view. The dashboard can filter visualizations by "Egl Type", "Platform", "Month" and a range for "$Bal(ABS)", and illustrate a "Number of Static Accounts by Platform" horizontal bar graph depicting the number of static accounts by platform based on each platform. The bars are categorized by the duration of the static accounts. A "Sum of Absolute Balances by eGL Type" bar graph displays the absolute balance of the accounts based on the eGL Type.

In some embodiments, an illogical balances for assets with credit balances dashboard can be generated by report generator 150 and displayed on a Tableau dashboard view. The dashboard can filter visualizations by "Month", "Platform" and "RLN name", and illustrate an "Assets with Credit Balances" horizontal bar graph depicting the number of accounts with illogical balances. This can be defined by identifying asset accounts with credit balances categorized by the different platforms.

In some embodiments, an illogical balances for liabilities with debit balances dashboard can be generated by report generator 150 and displayed on a Tableau dashboard view. The dashboard can filter visualizations by "Month", "Platform" and "RLN name", and illustrate a "Liabilities with Debit Balances" horizontal bar graph depicting the number of accounts with illogical balances. This can be defined by identifying liability accounts with debit balances categorized by the different platforms.

In some embodiments, a changing attestations dashboard can be generated by report generator 150 and displayed on a Tableau dashboard view. The dashboard can filter visualizations by "Platform", and illustrate a graph depicting the unique ID of accounts 101 with attestations that change over time. The unique ID can be specified by the eGL account, unit number, currency and view type. The following filters can be applied to dashboard: (1) the attestation status over the last year has changed 75% of the time or more; and (2) at least 6 months of attestations (attested to on a frequent basis).

Review and maintenance of the logic, data, parameters and thresholds used in risk assessor 100 may be reviewed on a regular basis, in an example, on an annual basis.

In some embodiments, certain risk criteria scores 124, such as for risk criteria 122 such as illogical balances and static balances, certain accounts may be excluded from that criteria after testing for multiple samples. Exclusion of accounts may be dependent on auditor judgement and is typically in instances where values are fixed or simply do not pertain to an account. For example, in rare cases the balance of an account will always be static. The fact that this balance is static therefore no longer serves as a risk indicator for that particular account, so this criteria is excluded.

In some embodiments, risk assessor 100 can be implemented in PySpark (the python API for Apache Spark) and base Python and can automatically analyze data on reconciliation and can run on an enterprise Hadoop Distributed File System (HDFS). The reconciliation data may be accessed using a data tool such as Dataiku (data management software).

Figure 7A:
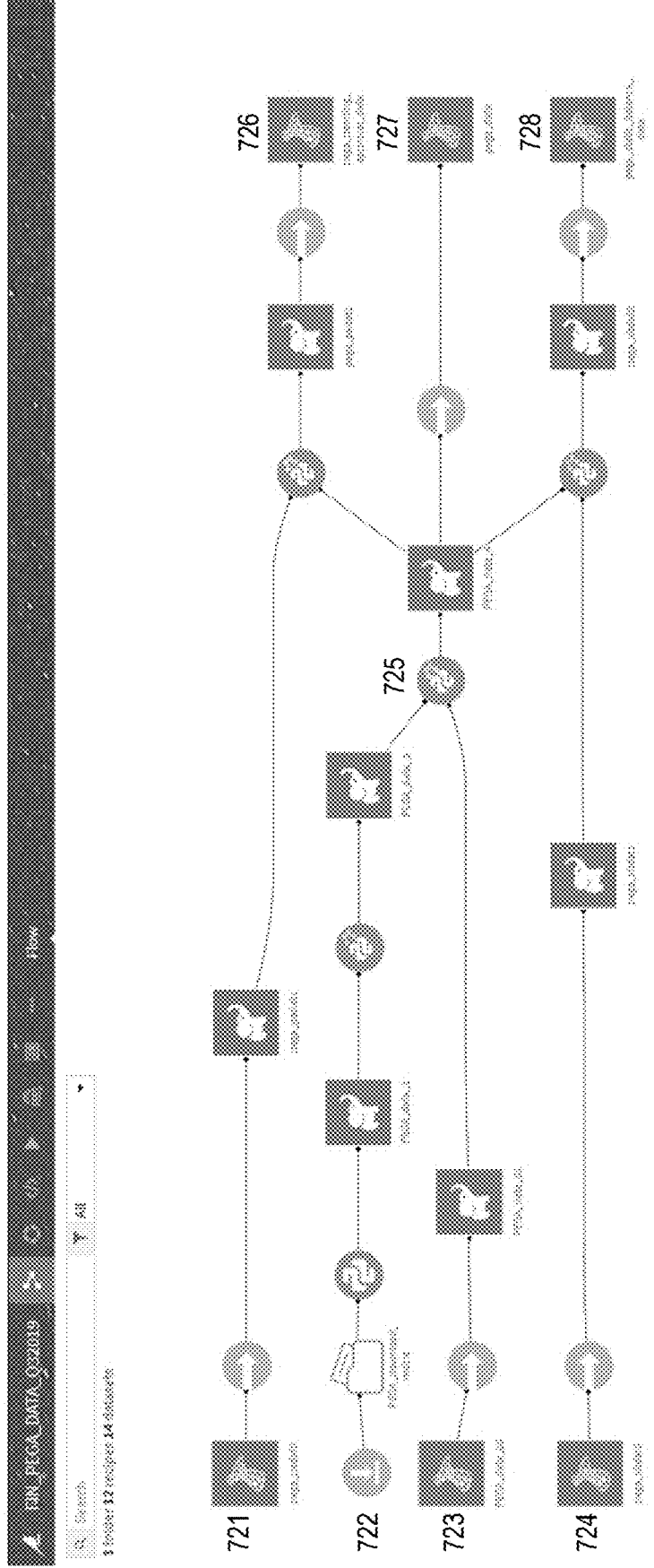
FIG. 7A is an example flow chart of a flow of information for data intake, according to an embodiment.
Figure 7B:
FIG. 7B is an example flow chart of a flow of information for feature engineering, according to an embodiment.
Figure 7C:
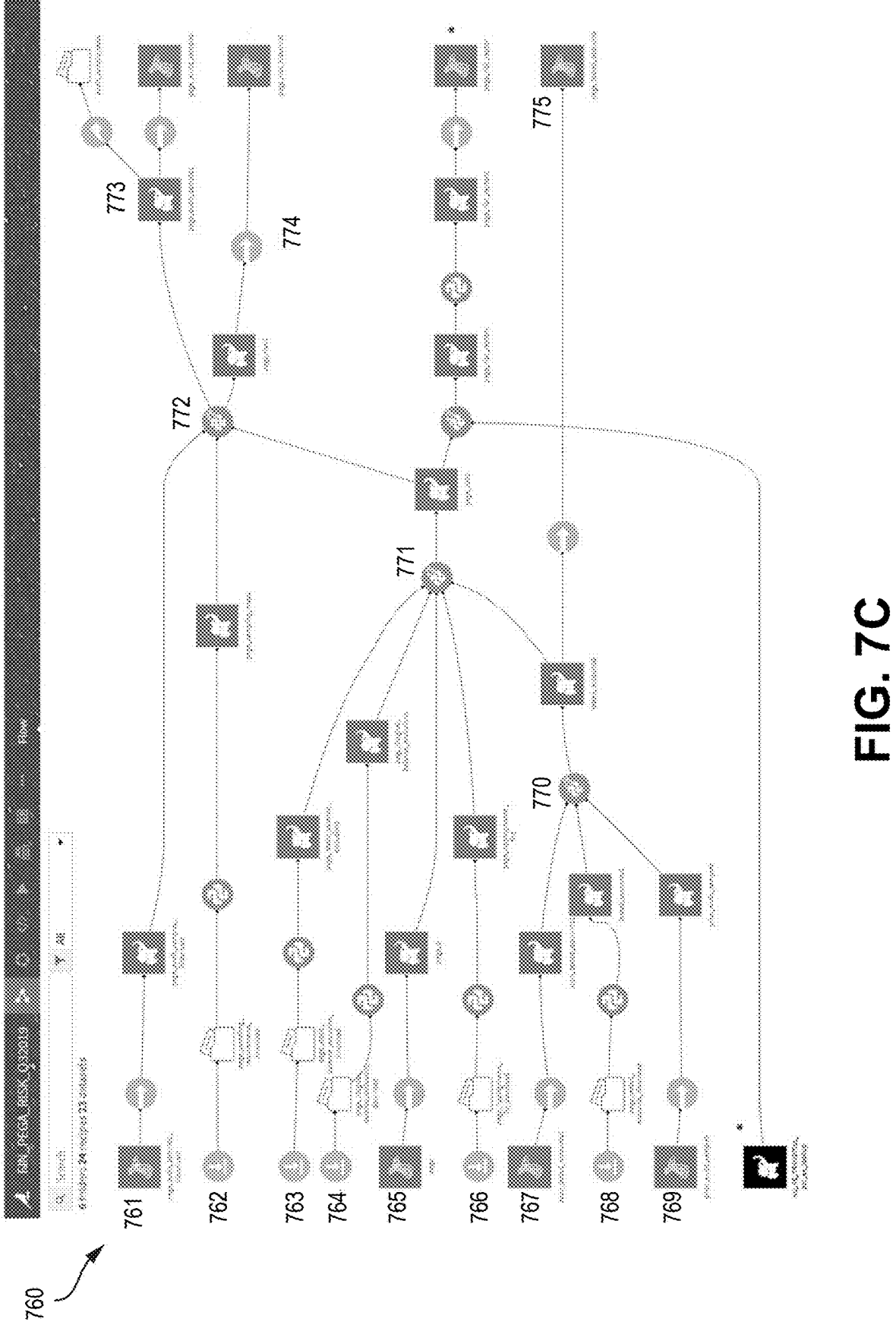
FIG. 7C is an example flow chart of a flow of information for risk scoring, according to an embodiment.

In some embodiments, components of risk assessor 100 (referred to as "PEGA") can be implemented on a platform such as Dataiku, as illustrated in FIGS. 7A-7C, in accordance with embodiments.

Data sources may be connected and accessible through a Dataiku platform implemented by data acquirer 110, with SQL queries run to extract the most up-to-date data from databases.

A Dataiku flow chart 720 illustrating a flow of information for data intake is shown, by way of example, in FIG. 7A. Flow chart 720 ingests data and does some minor data cleaning.

At block 721, risk assessor 100 loads in historical pending approval information (approval statuses).

At block 722, risk assessor 100 ingests new PEGA data.

At block 723, risk assessor 100 loads in historical PEGA data.

At block 724, risk assessor 100 loads in historical static balance information (account balances).

At block 725, risk assessor 100 adds new PEGA data to historical PEGA data.

At block 726, risk assessor 100 syncs pending approval information to the SCON (MS SQL Server).

At block 727, risk assessor 100 syncs PEGA data to the SCON.

At block 728, risk assessor 100 syncs static balance information to the SCON.

FIG. 7B is an example flow chart 740 of a flow of information for feature engineering (for example, risk criteria scores 124), according to an embodiment. The calculations for the metrics discussed below can be performed using techniques disclosed herein.

At block 741, risk assessor 100 pre-processes and cleans the PEGA data.

At block 742, risk assessor 100 updates static balance calculations.

At block 743, risk assessor 100 updates pending approval calculations.

At block 744, risk assessor 100 measures account balance volatility.

At block 745, risk assessor 100 calculates the changing attestation count.

At block 746, risk assessor 100 calculates the count of changing preparer and approving manager combinations.

At block 747, risk assessor 100 assesses whether or not an account is new for every account in the population.

At block 748, risk assessor 100 loads in country code related information.

At block 749, risk assessor 100 attaches the information obtained from 742 to 748 to the PEGA data.

At block 750, risk assessor 100 syncs the newly processed data to the SCON.

FIG. 7C is an example flow chart 760 of a flow of information for risk scoring, according to an embodiment.

At block 761, risk assessor 100 loads in the historical audit samples.

At block 762, risk assessor 100 loads in the auditor sampling specifications. This audit sample map will specify the audit sample size.

At block 763, risk assessor 100 loads in the static balance metric exclusion list for a small subset of accounts.

At block 764, risk assessor 100 loads in the illogical balance metric exclusion list for a small subset of accounts.

At block 765, risk assessor 100 loads in the processed PEGA data from "PEGA Feature Engineering" (see FIG. 7B).

At block 766, risk assessor 100 loads in a list of corrected approving manager names. This is for rare instances where the name provided in the data does not match with an employee name in Microsoft Outlook.

At block 767, risk assessor 100 loads in a list of previously tested accounts from the SCON.

At block 768, risk assessor 100 loads in a list of accounts provided by auditors that should not be tested. This list is generally unpopulated, and it is rare for anything to remain on it. Effectively it is just an override for when an account should not be tested. There are various rationale for why this could happen.

At block 769, risk assessor 100 loads in the prior audit sample from the most recent audit period.

At block 770, risk assessor 100 constructs a list of previously tested accounts to ensure that the current audit sample does not contain any of these accounts.

At block 771, risk assessor 100 processes the information obtained from steps 763 to 769, then converts the risk metrics using methodology to risk scores as disclosed herein.

At block 772, risk assessor 100 takes the newly processed data and flags the accounts in the data that should be included in the audit sample. These are effectively the top "x" accounts in the data with the highest composite score, where "x" is the auditor-specified audit sample size.

At block 773, risk assessor 100 syncs the PEGA data to the SCON.

At block 774, risk assessor 100 syncs the audit data that is to be sent back to the audited individuals on the PEGA team to the SCON.

At block 775, risk assessor 100 syncs an updated list of tested accounts to the SCON.

The asterisked processes illustrated in FIG. 7C are for data ingestion into other enterprise projects, providing cross-project functionality.

FIG. 8 illustrates a flow chart of a method 800 for risk assessment, in particular, in the context of reconciliation of electronic data processes, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

At block 802, data acquirer 110 receives account data for each of the accounts 101. The account data can include account records 111 including information such as a reconciliation status and a balance value for each account 101.

Blocks 804 and 806 are performed for each of the accounts 101.

At block 804, risk scorer 120 assigns risk criteria scores 124 for a plurality of risk criteria 122, based at least in part on one or more of reconciliation status and balance value for account 101.

In some embodiments, risk scorer 120 identifies whether the account 101 is an asset or a liability and a sign of the balance value, and the risk criteria scores 124 include a risk criteria score 124 for an illogical balance of the account based at least in part on whether the account 101 is an asset or a liability and the sign of the balance value.

In some embodiments, risk scorer 120 compares the balance value of the account 101 to historical balance data for the account 101 to determine a number of months that the balance value has been static, and the risk criteria scores 124 include a risk criteria score 124 for a static balance for the account based at least in part on the number of months the balance has been static compared to a density distribution of a number of months all of the accounts have been static.

In some embodiments, risk scorer 120 determines a median balance value and an interquartile balance value range for the account 101 based on historical balance values, and the risk criteria scores 124 include a risk criteria score 124 for an account balance outlier based at least in part on whether the balance value for the account 101 is above the interquartile balance value range.

In some embodiments, risk scorer 120 determines a number of months that the reconciliation status has a pending approval based on historical data, and the risk criteria scores 124 include a risk criteria score 124 for pending approvals based at least in part on the number of months the account 101 has had a pending approval as compared to a density distribution of a number of months all of the accounts 101 have had pending approval.

In some embodiments, risk scorer 120 compares the reconciliation status to historical reconciliation data for the account 101 to determine a number of times an attestation has changed in a time period, and the risk criteria scores 124 include a risk criteria score 124 for changing attestations based at least in part on the number of times an attestation has changed as compared to a density distribution of a number of times attestation has changed for all of the accounts 101.

In some embodiments, the risk criteria scores 124 include a risk criteria score 124 for new accounts 101 based at least in part on an age of the account 101.

In some embodiments, the risk criteria scores 124 include a risk criteria score 124 for changing preparer and manger based at least in part on a number of times a combination of prepare and approving manager associated with the account 101 changes as compared to a density distribution of a number of times a combination of prepare and approving manager has changed for all of the accounts 101.

In some embodiments, at least one of the risk criteria scores 124 is a value of zero or one on a binary scale.

In some embodiments, at least one of the risk criteria scores 124 is a value on a continuous scale.

In some embodiments, risk scorer 120 performs a log function on the at least one of the risk criteria scores 124.

In some embodiments, risk scorer 120 performs min-max scaling on the at least one of the risk criteria scores 124.

At block 806, risk scorer 120 determines a composite risk score 126 for account 101 based on a weighted summation of a selection of the risk criteria scores 124 for account 101.

In some embodiments, for each of the accounts 101, balance thresholder 130 determines whether the balance of the account 101 exceeds a balance threshold, the balance threshold based at least in part on a density distribution of balances of accounts 101 in a grouping.

At block 808, analyzer 140 generates a density distribution of the composite risk scores 126 for an audit population of accounts 101.

In some embodiments, the audit population includes accounts 101 within a geographic region.

In some embodiments, the audit population includes a selected number of accounts 101.

At block 810, quantiles are determined for the density distribution by analyzer 140.

At block 812, analyzer 140 identifies thresholds based at least in part on the quantiles of the density distribution.

At block 814, analyzer 140 assigns a risk rating to each of accounts 101 in the audit population based at least in part on the composite risk score 126 for that account 101 as compared to the thresholds.

In some embodiments, for an account 101 having a composite risk score 124 less than or equal to a third quartile of the density distribution, the risk rating assigned is low risk; for an account 101 having a composite risk score 124 between the third quartile and the third quartile plus a weighted factor of an inter-quartile range of the density distribution, the risk rating assigned is medium risk; and for an account 101 having a composite risk score 124 greater than or equal to the third quartile plus the weighted factor of the interquartile range of the density distribution, the risk rating assigned is high risk.

In some embodiments, accounts 101 that are assigned high risk are flagged for review.

Figure 9:
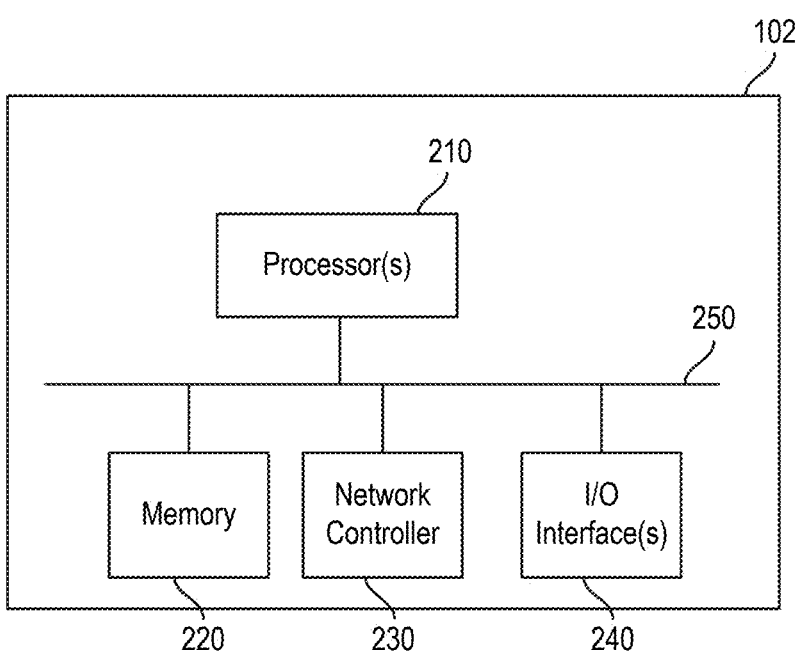
FIG. 9 is a block diagram of example hardware components of a computing device for risk assessment, according to an embodiment.

Risk assessor 100, in particular, one or more of data acquirer 110, risk scorer 120, balance thresholder 130, analyzer 140, report generator 150, and data store 160 may be implemented as software and/or hardware, for example, in a computing device 102 as illustrated in FIG. 9. Method 800, in particular, one or more of blocks 802 to 814, may be performed by software and/or hardware of a computing device such as computing device 102.

As illustrated, computing device 102 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 102. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of computing device 102 may include software to perform risk assessment, as described herein, and operating system (OS) software allowing for basic communication and application operations related to computing device 102.

Conveniently, human involvement may not be necessary for mapping data, extracting data, cleaning data and visualizing data. All the steps may be performed by data management software.

Once the tables are aggregated into one data set from accessed databases, risk assessor 100 analyzes the data and generates a final data set with risk scores for each entry.

Conveniently, such risk scores may not require thresholds or human judgement.

Once risk scores are totaled for an account, inter quartile range technique (IQR) may be used to assign risk categories across all accounts. IQR technique may allow for dynamic risk assessment to be performed as new entries are added every month. As the composition of the population changes, risk levels may also adjust automatically, by taking into account new and emerging risks.

In some embodiments, Tableau may be connected to an ecosystem where the file resides and a visual is produced automatically as new data comes in.

Risk assessor 100 may be performed on a monthly basis, to test data every month, and output account total score and identifying high risk accounts.

Concurrently, high risk accounts may be selected to test, and a matrix produced for auditor to indicate why an account was flagged as higher risk, and outlining the different risk criteria that were flagged.

Data may be updated and files organized, as well as an audit file generated. Certain individuals may be communicated to (for example, by email) to indicate that an account was flagged as higher risk.

Reconciliation may be requested, or an explanation from certain individuals, and that information may be organized in a working paper which can support an auditor who may perform analysis of the risk assessment and account.

Risk assessment as disclosed herein, such as performed by risk assessor 100, is a form unsupervised learning and is non-parametric. This offers an advantage over supervised learning in this particular context as it does not require massive amounts of labeled data to risk assess entities (accounts) within the population. In order to make use of a supervised learning approach, the data would have to be labeled by auditors, and this would be a massive undertaking for which auditors have no time to complete.

Traditional methodology made use of random sampling. It was technically automatic in the sense that 25 accounts out of a population containing somewhere in the neighborhood of 130,000 accounts were randomly selected. Unfortunately, a sample size of 25 is not representative (in the statistical sense) of a population of this size, and meaningful inference cannot be obtained from such a miniscule sample size. It is not representative since sample size is so small that it is not possible to observe the same data pattern in the sample as what would be observed in the entire population. While random sampling is a cornerstone of statistics, doing so with such a small sample size completely defeats its purpose.

Embodiments of risk assessor 100 disclosed herein can assign a continuous measurement of risk (e.g., composite risk score 126) to every account within the population and selects the top "x" highest risk accounts within the population, where the sample size "x" is specified by the auditor. This allows auditors or an audit department to focus their efforts on accounts that are more likely to exhibit an auditable issue, as opposed to the previous random sampling approach which is highly unlikely to return any meaningful results.

Most traditional audit approaches are random and not targeted like the approach being proposed herein, providing an innovative risk based audit approach.

Embodiments disclosed herein may also be several fold more efficient than any sort of manual calculations that would be performed by an individual. This approach can process thousands of accounts every month automatically without error and does so in a fraction of the time it would take an individual to do the same thing (with human error being inevitable given such a massive population size).

Embodiments can also make used of cluster computing and PySpark, which allows it to process millions of records at a time for calculations such as static balances, pending approvals and changing attestation statuses.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for managing anomalies of data set compositions using an unsupervised non-parametric model, comprising:

in accordance with an extraction schedule, automatically connecting, by a data acquirer, to a plurality of remote data sources and automatically extracting historical pending approval data and historical static balance data for a plurality of accounts from said plurality of remote data sources;

determining, by said data acquirer, whether nomenclature of said extracted data matches an expected nomenclature of said extracted data;

synchronizing said historical pending approval data from said plurality of remote data sources in a data store on a consolidated SQL server instance (SCON);

synchronizing said historical static balance data from said plurality of remote data sources in said consolidated SQL server instance (SCON);

generating a Structured Query Language (SQL) query to extract current data for said plurality of accounts from said plurality of remote data sources;

receiving current account data for each of the accounts based on said SQL query, the current account data including a reconciliation status and a balance value for each account;

synchronizing the received current account data in said consolidated SQL server instance (SCON);

receiving a set of risk metric data comprising at least one of historical audit samples, audit sampling specifications, a static balance metric exclusion list, an illogical balance metric exclusion list, and a list of previously tested accounts from said SCON;

for each of the accounts:

assigning dynamic risk criteria scores for a plurality of risk criteria, based at least in part on one or more of reconciliation status and balance value for the account and said risk metric data, wherein at least one of the risk criteria scores is a value on a continuous scale; and determining a composite risk score for the account based on a weighted summation of a selection of the risk criteria scores for the account;

synchronizing said composite risk score for the account to said consolidated SQL server instance (SCON);

generating a density distribution of the composite risk scores for a current audit population of the accounts;

determining quantiles for the density distribution;

identifying, based on a data set model, thresholds based at least in part on the quantiles of the density distribution, wherein the dynamically identified thresholds are a score representation associated with the current audit population;

assigning a risk rating of a plurality of risk ratings to each of the accounts in the audit population based at least in part on the composite risk score for that account as compared to the thresholds;

selecting one or more of said accounts in the audit population having a respective composite risk score above a threshold amount;

generating a matrix indicating why said selected one or more accounts were selected;

generating an audit file indicating said selected one or more accounts, said audit file including said matrix;

transmitting a message to an individual containing said audit file; and displaying, on a display device, a dashboard including, for at least one of said plurality of risk ratings, a table of accounts having said risk rating and a breakdown of a contribution of each of said risk criteria scores for each of said risk criteria for each of said accounts having said risk rating.

2. The method of claim 1, wherein the quantiles are quartiles.

3. The method of claim 2, wherein:

for an account having a composite risk score less than or equal to a third quartile of the density distribution, the risk rating assigned is low risk;

for an account having a composite risk score between the third quartile and the third quartile plus a weighted factor of an inter-quartile range of the density distribution, the risk rating assigned is medium risk; and for an account having a composite risk score greater than or equal to the third quartile plus the weighted factor of the interquartile range of the density distribution, the risk rating assigned is high risk.

4. The method of claim 1, further comprising, for each of the accounts, determining whether the balance of the account exceeds a balance threshold, the balance threshold based at least in part on a density distribution of balances of accounts in a grouping.

5. The method of claim 1, wherein the audit population includes accounts within a geographic region.

6. The method of claim 1, wherein the audit population includes a selected number of the accounts.

7. The method of claim 1, further comprising, for each of the accounts, identifying whether the account is an asset or a liability and a sign of the balance value, and the risk criteria scores include a risk criteria score for an illogical balance of the account based at least in part on whether the account is an asset or a liability and the sign of the balance value.

8. The method of claim 1, further comprising, for each of the accounts, comparing the balance value to historical balance data for the account to determine a number of months that the balance value has been static, and the risk criteria scores include a risk criteria score for a static balance for the account based at least in part on the number of months the balance has been static compared to a density distribution of a number of months all of the accounts have been static.

9. The method of claim 1, further comprising, for each of the accounts, determining a median balance value and an interquartile balance value range for the account based on historical balance values, and the risk criteria scores include a risk criteria score for an account balance outlier based at least in part on whether the balance value for the account is above the interquartile balance value range.

10. The method of claim 1, further comprising, for each of the accounts, determining a number of months that the reconciliation status has a pending approval based on said historical pending approval data, and the risk criteria scores include a risk criteria score for pending approvals based at least in part on the number of months the account has had a pending approval as compared to a density distribution of a number of months all of the accounts have had pending approval.

11. The method of claim 1, further comprising, for each of the accounts, comparing the reconciliation status to historical reconciliation data for the account to determine a number of times an attestation has changed in a time period, and the risk criteria scores include a risk criteria score for changing attestations based at least in part on the number of times an attestation has changed as compared to a density distribution of a number of times attestation has changed for all of the accounts.

12. The method of claim 1, wherein the risk criteria scores include a risk criteria score for new accounts based at least in part on an age of the account.

13. The method of claim 1, wherein the risk criteria scores include a risk criteria score for changing preparer and manger based at least in part on a number of times a combination of prepare and approving manager associated with the account changes as compared to a density distribution of a number of times a combination of prepare and approving manager has changed for all of the accounts.

14. The method of claim 1, wherein at least one of the risk criteria scores is a value of zero or one on a binary scale.

15. The method of claim 1, further comprising performing a log function on the at least one of the risk criteria scores.

16. The method of claim 1, further comprising performing min-max scaling on the at least one of the risk criteria scores.

17. The method of claim 1, further comprising selecting accounts for review based at least in part on the assigned risk ratings of the accounts from within the audit population.

18. The method of claim 1, further comprising: automatically extracting further historical pending approval data and historical static balance data in accordance with said extraction schedule; updating said dynamic risk scores after extracting said further historical pending approval data and historical static balance data; and automatically updating a visual of said dashboard as said further data is extracted.

19. A computer system comprising:

a processor; and a memory in communication with the processor, the memory storing instructions that cause the processor to perform a method for managing anomalies of data set compositions using an unsupervised non-parametric model, comprising:

in accordance with an extraction schedule, automatically connecting, by a data acquirer, to a plurality of remote data sources and automatically extracting historical pending approval data and historical static balance data for a plurality of accounts from said plurality of remote data sources;

determining, by said data acquirer, whether nomenclature of said extracted data matches an expected nomenclature of said extracted data;

synchronizing said historical pending approval data from said plurality of remote data sources in a data store on a consolidated SQL server instance (SCON);

synchronizing said historical static balance data from said plurality of remote data sources in said consolidated SQL server instance (SCON);

generating a Structured Query Language (SQL) query to extract current data for said plurality of accounts from said plurality of remote data sources;

receiving current account data for each of the accounts based on said SQL query, the current account data including a reconciliation status and a balance value for each account;

synchronizing the receiving current account data in said consolidated SQL server instance (SCON);

receiving a set of risk metric data comprising at least one of historical audit samples, audit sampling specifications, a static balance metric exclusion list, an illogical balance metric exclusion list, and a list of previously tested accounts from said SCON;

for each of the accounts:

assigning dynamic risk criteria scores for a plurality of risk criteria, based at least in part on one or more of reconciliation status and balance value for the account and said risk metric data, wherein at least one of the risk criteria scores is a value on a continuous scale; and determining a composite risk score for the account based on a weighted summation of a selection of the risk criteria scores for the account;

synchronizing said composite risk score for the account to said consolidated SQL server instance (SCON);

generating a density distribution of the composite risk scores for a current audit population of the accounts;

determining quantiles for the density distribution;

identifying thresholds based at least in part on the quantiles of the density distribution, wherein the dynamically identified thresholds are a score representation associated with the current audit population;

assigning a risk rating of a plurality of risk ratings to each of the accounts in the audit population based at least in part on the composite risk score for that account as compared to the thresholds;

selecting one or more of said accounts in the audit population having a respective composite risk score above a threshold amount;

generating a matrix indicating why said selected one or more accounts were selected;

generating an audit file indicating said selected one or more accounts, said audit file including said matrix;

transmitting a message to an individual containing said audit file; and displaying, on a display device, dashboard including, for at least one of said plurality of risk ratings, a table of accounts having said risk rating and a breakdown of a contribution of each of said risk criteria scores for each of said risk criteria for each of said accounts having said risk rating.

20. A non-transitory computer-readable medium having computer executable instructions stored thereon for execution by one or more computing devices that cause a processor of the one or more computing devices to:

in accordance with an extraction schedule, automatically connecting, by a data acquirer, to a plurality of remote data sources and automatically extracting historical pending approval data and historical static balance data for a plurality of accounts from said plurality of remote data sources;

determining, by said data acquirer, whether nomenclature of said extracted data matches an expected nomenclature of said extracted data;

synchronizing said historical pending approval data from said plurality of remote data sources in a data store on a consolidated SQL server instance (SCON);

synchronizing said historical static balance data from said plurality of remote data sources in said consolidated SQL server instance (SCON);

generating a Structured Query Language (SQL) query to extract current data for said plurality of accounts from said plurality of remote data sources;

receive current account data for each of the accounts based on said SQL query, the current account data including a reconciliation status and a balance value for each account;

synchronizing the received current account data in said consolidated SQL server instance (SCON);

receiving a set of risk metric data comprising at least one of historical audit samples, audit sampling specifications, a static balance metric exclusion list, an illogical balance metric exclusion list, and a list of previously tested accounts from said SCON;

for each of the accounts:

assign dynamic risk criteria scores for a plurality of risk criteria, based at least in part on one or more of reconciliation status and balance value for the account and said risk metric data, wherein at least one of the risk criteria scores is a value on a continuous scale; and determine a composite risk score for the account based on a weighted summation of a selection of the risk criteria scores for the account;

synchronizing said composite risk score for the account to said consolidated SQL server instance (SCON);

generate a density distribution of the composite risk scores for a current audit population of the accounts;

determine quantiles for the density distribution;

identify thresholds based at least in part on the quantiles of the density distribution, wherein the dynamically identified thresholds are a score representation associated with the current audit population;

assign a risk rating of a plurality of risk ratings to each of the accounts in the audit population based at least in part on the composite risk score for that account as compared to the thresholds;

select one or more of said accounts in the audit population having a respective composite risk score above a threshold amount;

generate a matrix indicating why said selected one or more accounts were selected;

generate an audit file indicating said selected one or more accounts, said audit file including said matrix;

transmit a message to an individual containing said audit file; and displaying, on a display device, a dashboard including, for at least one of said plurality of risk ratings, a table of accounts having said risk rating and a breakdown of a contribution of each of said risk criteria scores for each of said risk criteria for each of said accounts having said risk rating.

* * * * *